US009489951B2

(12) United States Patent
Kobayashi

(10) Patent No.: US 9,489,951 B2
(45) Date of Patent: Nov. 8, 2016

(54) INFORMATION PROCESSING SYSTEM, INFORMATION PROCESSING METHOD, COMMUNICATION TERMINAL, INFORMATION PROCESSING APPARATUS, AND CONTROL METHOD AND CONTROL PROGRAM THEREOF

(71) Applicant: NEC Corporation, Tokyo (JP)

(72) Inventor: Yoshikazu Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 22 days.

(21) Appl. No.: 14/403,268

(22) PCT Filed: May 22, 2013

(86) PCT No.: PCT/JP2013/064238
§ 371 (c)(1),
(2) Date: Nov. 24, 2014

(87) PCT Pub. No.: WO2013/179985
PCT Pub. Date: Dec. 5, 2013

(65) Prior Publication Data
US 2015/0142437 A1 May 21, 2015

(30) Foreign Application Priority Data

May 30, 2012 (JP) .................................. 2012-123804

(51) Int. Cl.
*G10L 15/00* (2013.01)
*G10L 17/22* (2013.01)
(Continued)

(52) U.S. Cl.
CPC ............... *G10L 17/22* (2013.01); *G06F 3/017* (2013.01); *G06F 3/0304* (2013.01); *G06F 3/167* (2013.01);
(Continued)

(58) Field of Classification Search
CPC ............................ G10L 15/25; G10L 15/265
USPC ........................................................ 704/275
See application file for complete search history.

(56) References Cited

U.S. PATENT DOCUMENTS 6,185,529 B1 * 2/2001 Chen ..................... G10L 15/25
704/231
7,437,488 B2 * 10/2008 Ito ....................... B60R 16/0373
710/15

(Continued)

FOREIGN PATENT DOCUMENTS

EP        2450879 A1      5/2012
JP        10-214258 A     8/1998
(Continued)

OTHER PUBLICATIONS

International Search Report corresponding to PCT/JP2013/064238, dated Jul. 16, 2013 (5 pages).

(Continued)

*Primary Examiner* — Daniel Abebe
(74) *Attorney, Agent, or Firm* — Wilmer Cutler Pickering Hale and Corr LLP

(57) ABSTRACT

An apparatus of this invention is directed to an information processing apparatus that determines a search range of one of the pieces of instruction information based on the other of a plurality of different pieces of instruction information, and effectively narrows down manipulation instruction candidates corresponding to a user even if the manipulation instruction candidates are extended. The information processing apparatus includes an instruction information receiver that receives instruction voice information indicating the instruction voice of the user acquired from the voice of the user, and instruction operation information indicating the instruction operation of the user acquired from the operation of the user, a search range determining unit that determines a search range for recognizing the instruction operation information according to the instruction voice information, or determines a search range for recognizing the instruction voice information according to the instruction operation information, and a user instruction recognizer that recognizes an instruction of the user based on a search result obtained by searching for one of the instruction voice information and the instruction operation information within the search range determined by the search range determining unit.

19 Claims, 23 Drawing Sheets

(51) Int. Cl.
  *G06F 3/16*    (2006.01)
  *G06F 3/01*    (2006.01)
  *G06F 3/03*    (2006.01)
  *G10L 15/08*   (2006.01)
  *H04L 29/08*   (2006.01)
  *G10L 15/22*   (2006.01)
  *G10L 15/30*   (2013.01)

(52) U.S. Cl.
  CPC ............... *G10L 15/08* (2013.01); *G10L 15/22* (2013.01); *H04L 67/10* (2013.01); *G06F 2203/0381* (2013.01); *G10L 15/30* (2013.01); *G10L 2015/227* (2013.01); *G10L 2015/228* (2013.01)

(56) References Cited

U.S. PATENT DOCUMENTS

| | | | |
|---|---|---|---|
| 7,761,731 B2* | 7/2010 | Omi | G06F 11/0769 714/2 |
| 2001/0020837 A1* | 9/2001 | Yamashita | B25J 13/003 318/567 |
| 2002/0036617 A1 | 3/2002 | Pryor | |
| 2002/0118232 A1 | 8/2002 | Watanabe et al. | |
| 2003/0097190 A1 | 5/2003 | Watanabe et al. | |
| 2005/0086056 A1* | 4/2005 | Yoda | G10L 15/24 704/246 |
| 2006/0023949 A1 | 2/2006 | Saito et al. | |
| 2006/0033713 A1 | 2/2006 | Pryor | |
| 2008/0059175 A1* | 3/2008 | Miyajima | G10L 15/25 704/246 |
| 2011/0059798 A1 | 3/2011 | Pryor | |
| 2012/0040755 A1 | 2/2012 | Pryor | |
| 2012/0112995 A1 | 5/2012 | Maeda | |
| 2013/0169527 A1 | 7/2013 | Pryor | |
| 2013/0179034 A1 | 7/2013 | Pryor | |
| 2013/0249791 A1 | 9/2013 | Pryor | |

FOREIGN PATENT DOCUMENTS

| | | |
|---|---|---|
| JP | 2002-182680 A | 6/2002 |
| JP | 2002-251234 A | 9/2002 |
| JP | 2004-317604 A | 11/2004 |
| JP | 2007-079624 A | 3/2007 |

OTHER PUBLICATIONS

Extended European Search Report issued in corresponding European Application No. 13797821.9, dated Feb. 19, 2016, 8 pages.

Masaya Iwasawa et al. "Obtaining an Object Position Using Multimodal Interaction for a Service Robot", The 18th IEEE International Symposium on Robot and Human Interactive Communication, Toyama, Japan, XP031563690, Sep. 27-Oct. 2009, pp. 1155-1160.

* cited by examiner

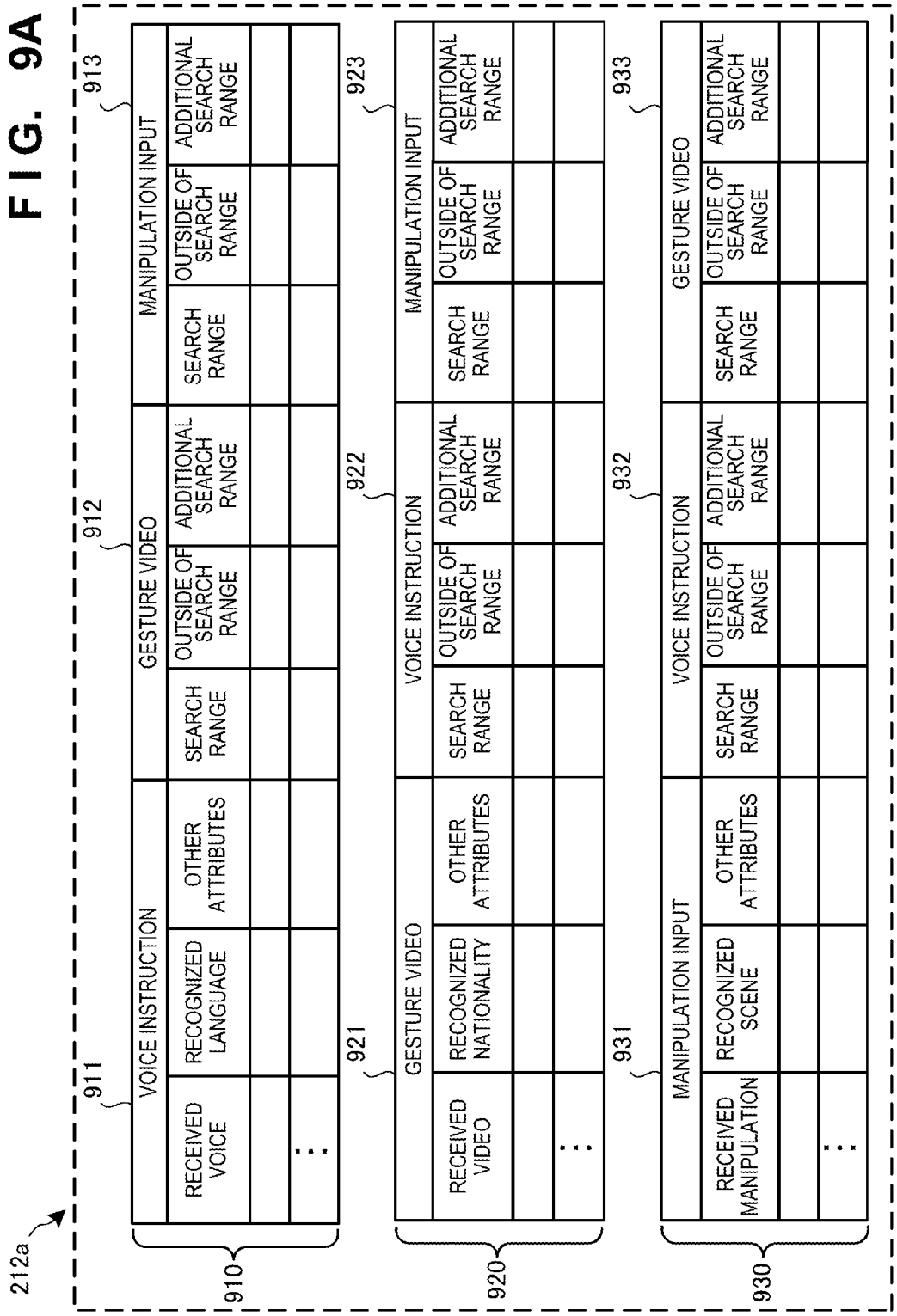

FIG. 9C

| | VOICE INSTRUCTION 951 | | GESTURE VIDEO 952 | | | MANIPULATION INPUT 953 | | INSTRUCTION RECOGNITION RESULT 954 | SUCCESS RATE 955 |
|---|---|---|---|---|---|---|---|---|---|
| 213a | RECEIVED VOICE | SEARCH RANGE | INSTRUCTION PREDICTION | RECEIVED VIDEO | SEARCH RANGE | INSTRUCTION PREDICTION | RECEIVED MANIPULATION | SEARCH RANGE | INSTRUCTION PREDICTION | | |
| | | | ... | | | | | | ... | |

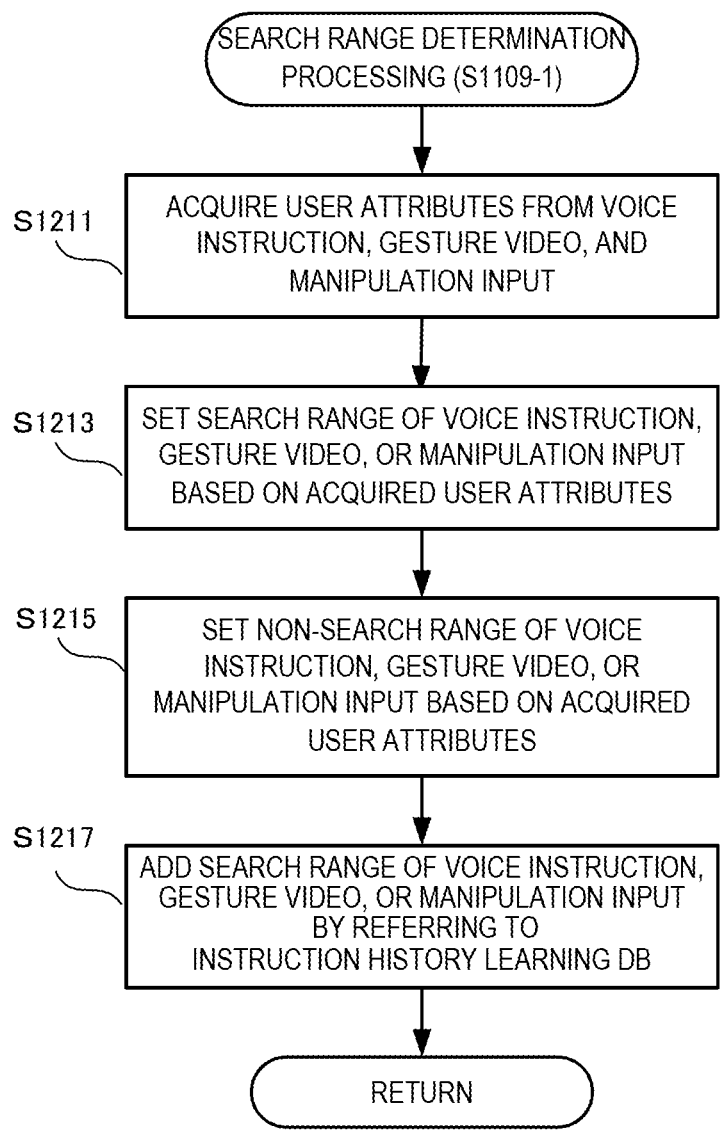
F I G. 12A

FIG. 16

| 1601 | 1602 | 1603 | 1604 | 1605 | 1606 | 1607 |
|---|---|---|---|---|---|---|
| CAMERA VIDEO | DISPLAY VIDEO | VOICE INPUT | MOTION SEARCH RANGE | TOUCH PANEL MOTION | INSTRUCTION RECOGNITION RESULT | SUCCESS RATE |
|  |  |  |  |  |  |  |
|  |  |  | ... |  |  |  |
|  |  |  | ... |  |  |  |
| ... |  |  |  |  |  |  |

1514

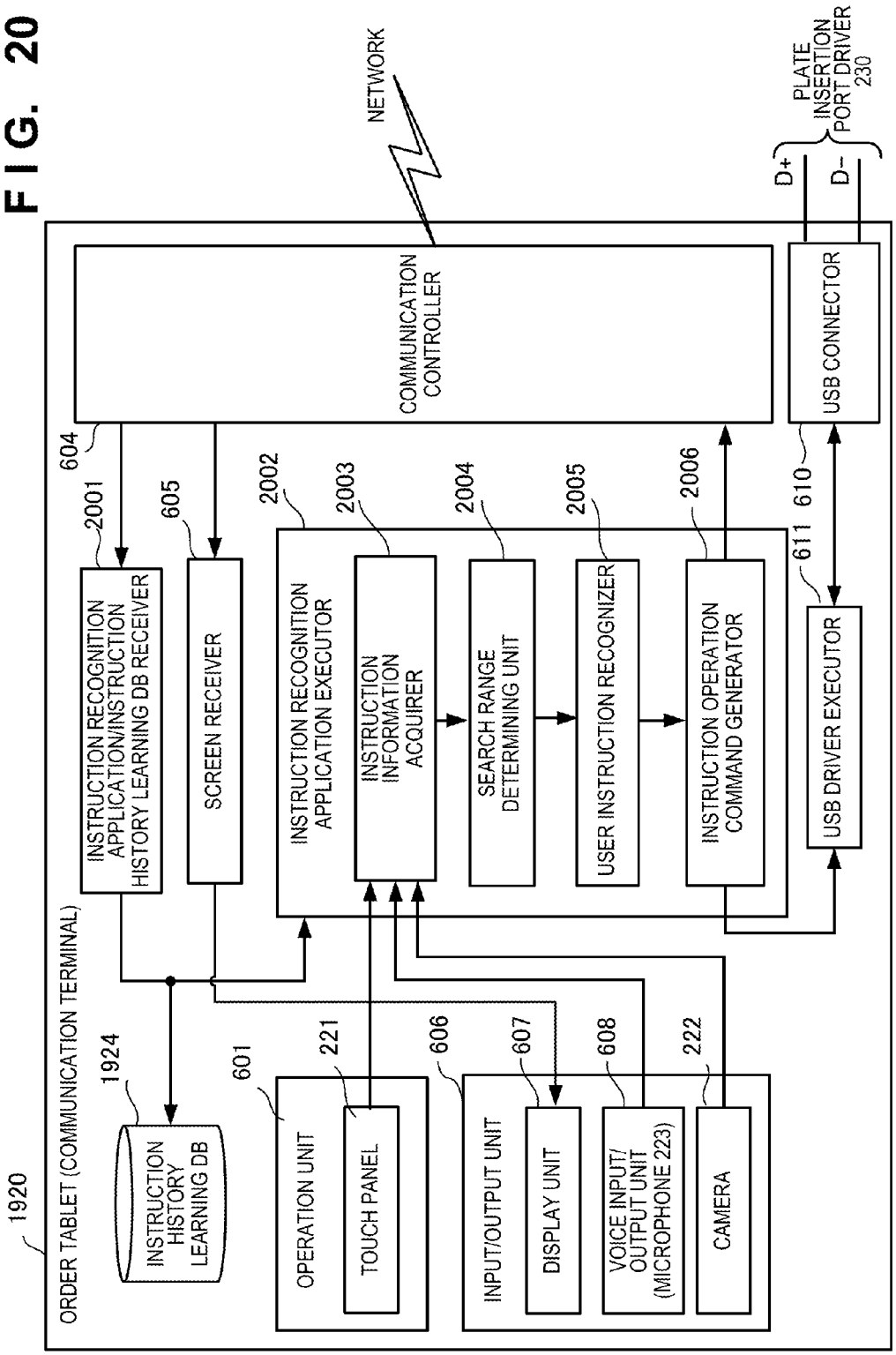

INFORMATION PROCESSING SYSTEM, INFORMATION PROCESSING METHOD, COMMUNICATION TERMINAL, INFORMATION PROCESSING APPARATUS, AND CONTROL METHOD AND CONTROL PROGRAM THEREOF

CROSS-REFERENCE TO RELATED APPLICATIONS

This application is a national stage application of International Application No. PCT/JP2013/064238 entitled "INFORMATION PROCESSING SYSTEM, INFORMATION PROCESSING METHOD, COMMUNICATION TERMINAL, INFORMATION PROCESSING APPARATUS, AND CONTROL METHOD AND CONTROL PROGRAM THEREOF," filed on May 22, 2013, which claims the benefit of the priority of Japanese Patent Application No. 2012-123804, filed on May 30, 2012, the disclosures of each of which are hereby incorporated by reference in their entirety.

TECHNICAL FIELD

The present invention relates to a technique of recognizing the contents of a user instruction based on a plurality of different pieces of instruction information.

BACKGROUND ART

In the above technical field, patent literature 1 discloses a technique of integrating manipulation instruction candidates based on a user's gesture shot by a camera and manipulation instruction candidates based on a user's voice collected by a microphone, and outputting one manipulation instruction intended by the user.

CITATION LIST

Patent Literature

Patent literature 1: Japanese Patent Laid-Open No. 2002-182680

SUMMARY OF THE INVENTION

Technical Problem

In the technique described in the above literature, however, manipulation instruction candidates based on a user's gesture and manipulation instruction candidates based on a user's voice are analyzed independently of each other. Therefore, it is impossible to effectively narrow down the manipulation instruction candidates corresponding to the user.

The present invention enables to provide a technique of solving the above-described problem.

Solution to Problem

One aspect of the present invention provides an information processing apparatus comprising:

an instruction information receiver that receives instruction voice information indicating an instruction voice of a user acquired from a voice of the user, and instruction operation information indicating an instruction operation of the user acquired from an operation of the user;

a search range determining unit that determines one of a search range for recognizing the instruction operation information according to the instruction voice information and a search range for recognizing the instruction voice information according to the instruction operation information; and a user instruction recognizer that recognizes an instruction of the user based on a search result obtained by searching for one of the instruction voice information and the instruction operation information within the search range determined by the search range determining unit.

Another aspect of the present invention provides a control method of an information processing apparatus, comprising:

receiving instruction voice information indicating an instruction voice of a user acquired from a voice of the user, and instruction operation information indicating an instruction operation of the user acquired from an operation of the user;

determining one of a search range for recognizing the instruction operation information according to the instruction voice information and a search range for recognizing the instruction voice information according to the instruction operation information; and recognizing an instruction of the user based on a search result obtained by searching for one of the instruction voice information and the instruction operation information within the search range determined in the determining step.

Still other aspect of the present invention provides a control program of an information processing apparatus for causing a computer to execute a method, comprising:

receiving instruction voice information indicating an instruction voice of a user acquired from a voice of the user, and instruction operation information indicating an instruction operation of the user acquired from an operation of the user;

determining one of a search range for recognizing the instruction operation information according to the instruction voice information and a search range for recognizing the instruction voice information according to the instruction operation information; and recognizing an instruction of the user based on a search result obtained by searching for one of the instruction voice information and the instruction operation information within the search range determined in the determining step.

Still other aspect of the present invention provides a communication terminal comprising:

a voice detector that detects a voice of a user;

an operation detector that detects an operation of the user;

an instruction information transmitter that acquires instruction voice information indicating an instruction voice of the user via said voice detector, acquires instruction operation information indicating an instruction operation of the user via said operation detector, and transmits, to an information processing apparatus, the instruction voice information and the instruction operation information together with device information of a device as an instruction target of the user;

an operation command receiver that receives, from the information processing apparatus, an operation command of the device according to an instruction of the user recognized by the information processing apparatus based on the instruction voice information and the instruction operation information; and an operation command output unit that outputs, to the device as the instruction target of the user, the operation command received by the operation command receiver.

Still other aspect of the present invention provides a control method of a communication terminal, comprising:

acquiring instruction voice information indicating an instruction voice of a user via a voice detector that detects a voice of the user, acquires instruction operation information indicating an instruction operation of the user via an operation detector that detects an operation of the user, and transmits, to an information processing apparatus, the instruction voice information and the instruction operation information together with device information of a device as an instruction target of the user;

receiving, from the information processing apparatus, an operation command of the device according to an instruction of the user recognized by the information processing apparatus based on the instruction voice information and the instruction operation information; and outputting, to the device as the instruction target of the user, the operation command received in the receiving step.

Still other aspect of the present invention provides a control program of a communication terminal for causing a computer to execute a method, comprising:

acquiring instruction voice information indicating an instruction voice of a user via a voice detector that detects a voice of the user, acquires instruction operation information indicating an instruction operation of the user via an operation detector that detects an operation of the user, and transmits, to an information processing apparatus, the instruction voice information and the instruction operation information together with device information of a device as an instruction target of the user;

receiving, from the information processing apparatus, an operation command of the device according to an instruction of the user recognized by the information processing apparatus based on the instruction voice information and the instruction operation information; and outputting, to the device as the instruction target of the user, the operation command received in the receiving step.

Still other aspect of the present invention provides a communication terminal comprising:

a voice detector that detects a voice of a user;

an operation detector that detects an operation of the user;

an instruction information acquirer that acquires instruction voice information indicating an instruction voice of the user acquired from a voice of the user, and instruction operation information indicating an instruction operation of the user acquired from an operation of the user;

a search range determining unit that determines one of a search range for recognizing the instruction operation information according to the instruction voice information and a search range for recognizing the instruction voice information according to the instruction operation information; and a user instruction recognizer that recognizes an instruction of the user based on a search result obtained by searching for one of the instruction voice information and the instruction operation information within the search range determined by the search range determining unit.

Still other aspect of the present invention provides a control method of a communication terminal, comprising:

detecting a voice of a user;

detecting an operation of the user;

acquiring instruction voice information indicating an instruction voice of the user acquired from a voice of the user, and instruction operation information indicating an instruction operation of the user acquired from an operation of the user;

determining one of a search range for recognizing the instruction operation information according to the instruction voice information and a search range for recognizing the instruction voice information according to the instruction operation information; and recognizing an instruction of the user based on a search result obtained by searching for one of the instruction voice information and the instruction operation information within the search range determined in the determining step.

Still other aspect of the present invention provides a control program of a communication terminal for causing a computer to execute a method, comprising:

detecting a voice of a user;

detecting an operation of the user;

acquiring instruction voice information indicating an instruction voice of the user acquired from a voice of the user, and instruction operation information indicating an instruction operation of the user acquired from an operation of the user;

determining one of a search range for recognizing the instruction operation information according to the instruction voice information and a search range for recognizing the instruction voice information according to the instruction operation information; and recognizing an instruction of the user based on a search result obtained by searching for one of the instruction voice information and the instruction operation information within the search range determined in the determining step.

Still other aspect of the present invention provides an information processing system including an information processing apparatus and a communication terminal which are connected via a network, the information processing apparatus comprising:

an instruction information receiver that receives, together with device information of a device as an instruction target of a user, instruction voice information indicating an instruction voice of the user acquired from a voice of the user, and instruction operation information indicating an instruction operation of the user acquired from an operation of the user;

a search range determining unit that determines one of a search range for recognizing the instruction operation information according to the instruction voice information and a search range for recognizing the instruction voice information according to the instruction operation information;

a user instruction recognizer that recognizes an instruction of the user based on a search result obtained by searching for one of the instruction voice information and the instruction operation information within the search range determined by the search range determining unit; and an operation command transmitter that transmits an operation command of the device according to the instruction of the user recognized by the user instruction recognizer, and the communication terminal comprising:

a voice detector that detects the voice of the user;

an operation detector that detects the operation of the user;

an instruction information transmitter that acquires the instruction voice information via said voice detector, acquires the instruction operation information via said operation detector, and transmits, to the information processing apparatus, the instruction voice information and the instruction operation information together with the device information of the device;

an operation command receiver that receives, from the information processing apparatus, the operation command of the device according to the instruction of the user recognized by the information processing apparatus based on the instruction voice information and the instruction operation information; and an operation command output unit that outputs, to the device as the instruction target of the user, the operation command received by the operation command receiver.

Still other aspect of the present invention provides an information processing method of an information processing system including an information processing apparatus and a communication terminal which are connected via a network, comprising:

by the information processing apparatus, receiving, together with device information of a device as an instruction target of the user, instruction voice information indicating an instruction voice of a user acquired from a voice of the user, and instruction operation information indicating an instruction operation of the user acquired from an operation of the user;

determining one of a search range for recognizing the instruction operation information according to the instruction voice information and a search range for recognizing the instruction voice information according to the instruction operation information;

recognizing an instruction of the user based on a search result obtained by searching for one of the instruction voice information and the instruction operation information within the search range determined in the determining step; and transmitting an operation command of the device according to the instruction of the user recognized in the recognizing step, and by the communication terminal, acquiring the instruction voice information via a voice detector that detects the voice of the user, acquires the instruction operation information via said operation detector that detects the operation of the user, and transmits, to an information processing apparatus, the instruction voice information and the instruction operation information together with the device information of the device;

receiving, from the information processing apparatus, the operation command of the device according to an instruction of the user recognized by the information processing apparatus based on the instruction voice information and the instruction operation information; and outputting, to the device as the instruction target of the user, the operation command received in the receiving step.

Advantageous Effects of Invention

According to the present invention, the search range of one of a plurality of different pieces of instruction information is determined based on the other of the pieces of instruction information. Therefore, even if manipulation instruction candidates are extended, it is possible to effectively narrow down the manipulation instruction candidates corresponding to the user.

BRIEF DESCRIPTION OF DRAWINGS

FIG. 9A is a view showing the structure of a search range determination table according to the second embodiment of the present invention;

FIG. 9C is a table showing the structure of an instruction information recognition table according to the second embodiment of the present invention;

FIG. 12A is a flowchart illustrating the processing procedure of search range determination processing according to the second embodiment of the present invention;

FIG. 16 is a table showing the structure of an instruction history learning database according to the third embodiment of the present invention;

FIG. 20 is a block diagram showing the functional arrangement of an order tablet according to the fifth embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

An information processing apparatus 100 according to the first embodiment of the present invention will be described with reference to FIG. 1. The information processing apparatus 100 is an apparatus that recognizes the instruction contents of each of users 111 to 11n.

Figure 1:
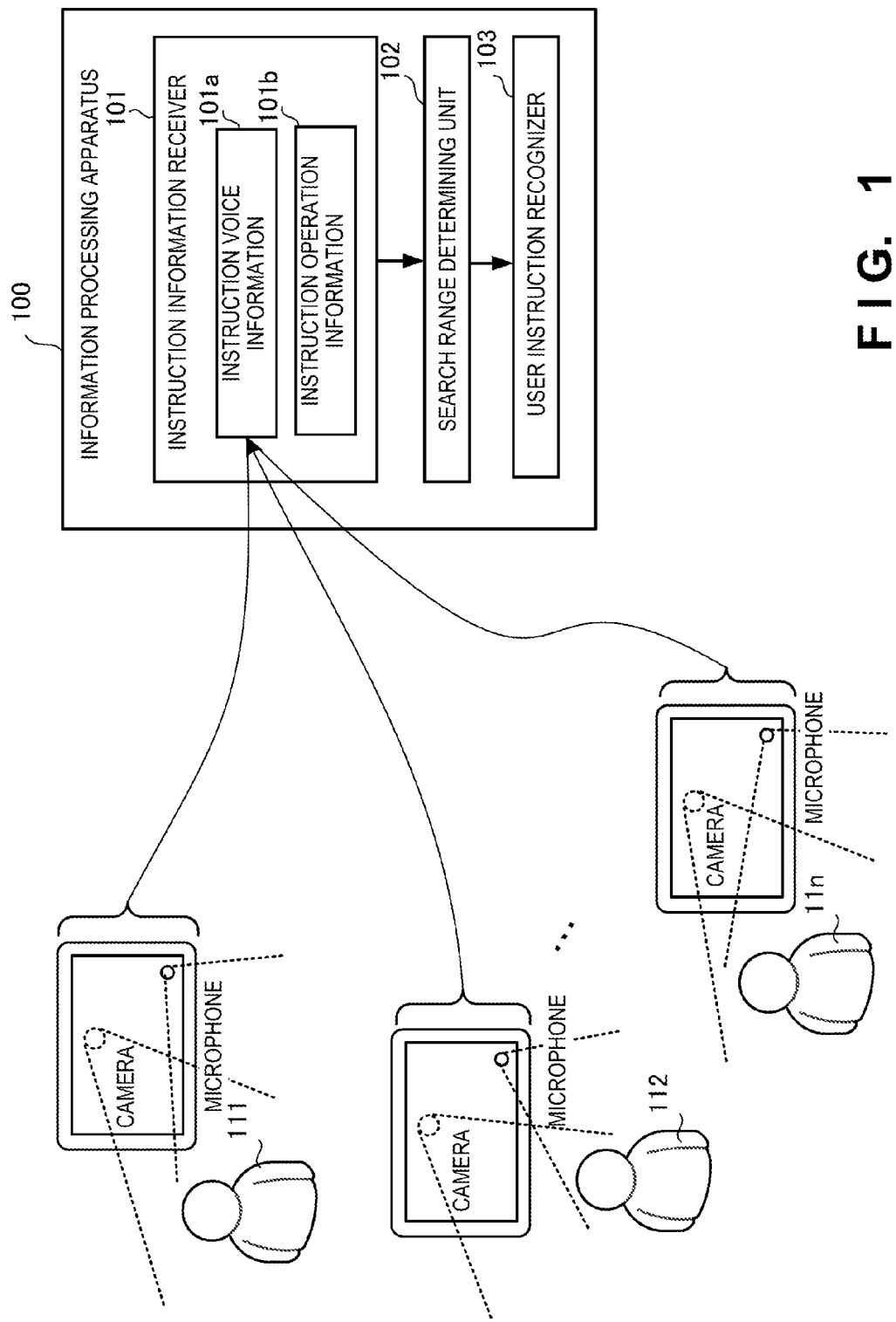
FIG. 1 is a block diagram showing the arrangement of an information processing apparatus according to the first embodiment of the present invention.

As shown in FIG. 1, the information processing apparatus 100 includes an instruction information receiver 101, a search range determining unit 102, and a user instruction recognizer 103. The instruction information receiver 101 receives instruction voice information 101a indicating a user's instruction voice acquired via the voice of each of the users 111 to 11n, and instruction operation information 101b indicating a user's instruction operation acquired via the operation of each of the users 111 to 11n. The search range determining unit 102 determines a search range for recognizing the instruction operation information 101b in accordance with the instruction voice information 101a, or determines a search range for recognizing the instruction voice information 101a in accordance with the instruction operation information 101b. The user instruction recognizer 103 searches for the instruction voice information 101a or the instruction operation information 101b within the search range determined by the search range determining unit 102, thereby recognizing a user's instruction based on a search result.

According to this embodiment, the search range of one of a plurality of different pieces of instruction information is determined based on the other of the pieces of instruction information. Therefore, even if manipulation instruction candidates are extended, it is possible to effectively narrow down the manipulation instruction candidates corresponding to the user.

Second Embodiment

An information processing system according to the second embodiment of the present invention will be described. The information processing system according to this embodiment acquires instruction voice information by a user's voice and instruction operation information by a user's gesture or motion, and determines the search range of each of the pieces of information, within which manipulation instruction candidates are searched.

In the information processing system according to this embodiment, a case in which a worker gives an instruction to drive a plate insertion port in automatic plate collection in a conveyor belt sushi restaurant will be explained as a practical example. The worker issues a voice instruction together with an operation instruction by a gesture or motion using a hand or finger. A camera and microphone are mounted in an order tablet prepared at a table in the conveyor belt sushi restaurant, and acquire instruction operation information by a gesture or motion and instruction voice information, respectively. A cloud server as an information processing apparatus determines, based on one of the instruction operation information and instruction voice information, the search range of manipulation instruction candidates of the other of the pieces of information from the accumulated past history. For example, a search range is determined based on the fact that an instruction has been issued at a table in the conveyor belt sushi restaurant, the search range of an operation instruction is determined based on a use language and nationality according to an instruction voice, or the search range of a voice instruction is determined based on a race and habit according to an instruction operation.

According to this embodiment, since manipulation instruction candidates are searched by narrowing them down to a search range corresponding to the attributes of the user who has issued a manipulation instruction, an enormous number of manipulation instruction candidates including different user attributes can be prepared. Even in this case, it is possible to effectively narrow down manipulation instruction candidates corresponding to the user.

Note that in this embodiment, a case in which an instruction operation command is returned to an order tablet based on a recognized manipulation instruction will be described. This embodiment is useful as a technique of recognizing a manipulation instruction.

<<Information Processing System>>

The operation of an information processing system 200 according to this embodiment will be described with reference to FIGS. 2 to 4.

(System Arrangement)

Figure 2:
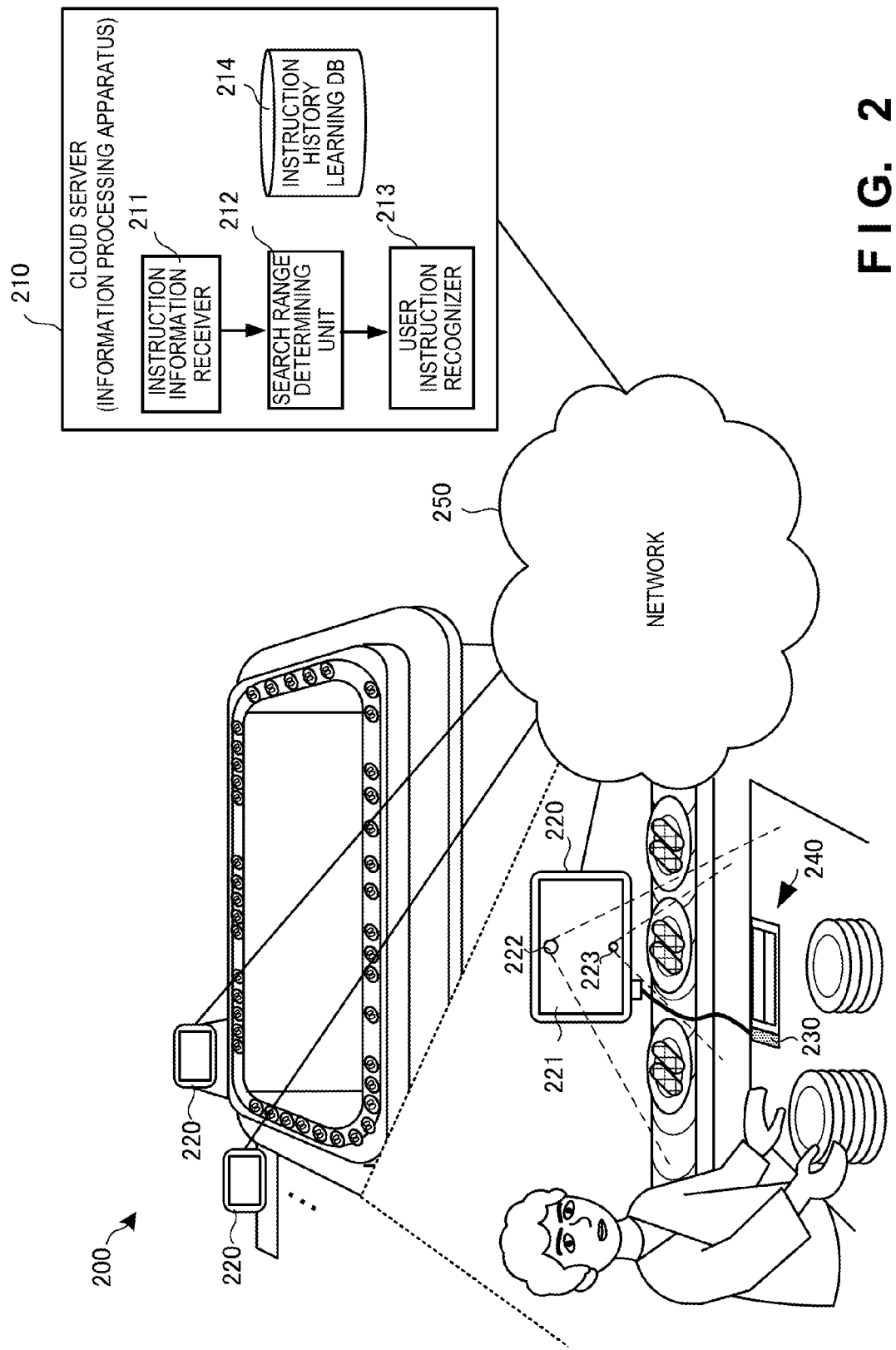
FIG. 2 is a block diagram showing the arrangement of an information processing system according to the second embodiment of the present invention.

FIG. 2 is a block diagram showing the arrangement of the information processing system 200 according to this embodiment.

The information processing system 200 includes a cloud server 210 as an information processing apparatus, an order tablet 220 as a communication terminal connected to the cloud server 210 via a network 250, a plate insertion port driver 230 connected to the order tablet 220, and a plate insertion port 240.

The order tablet 220 has a function of ordering sushi by issuing an instruction by the user using a touch panel 221, and also captures the videos of a worker and the user at a table by a camera 222, and acquires the voices of the worker and user by a microphone 223. The videos and voices of the worker and user are transmitted to the cloud server 210 via the network 250.

The cloud server 210 includes an instruction information receiver 211, a search range determining unit 212, and a user instruction recognizer 213. The cloud server 210 also includes an instruction history learning database (an instruction history learning DB in FIG. 2) 214 serving as an instruction history accumulator that accumulates an instruction history of the worker and user.

(Concept of Operation)

Figure 3:
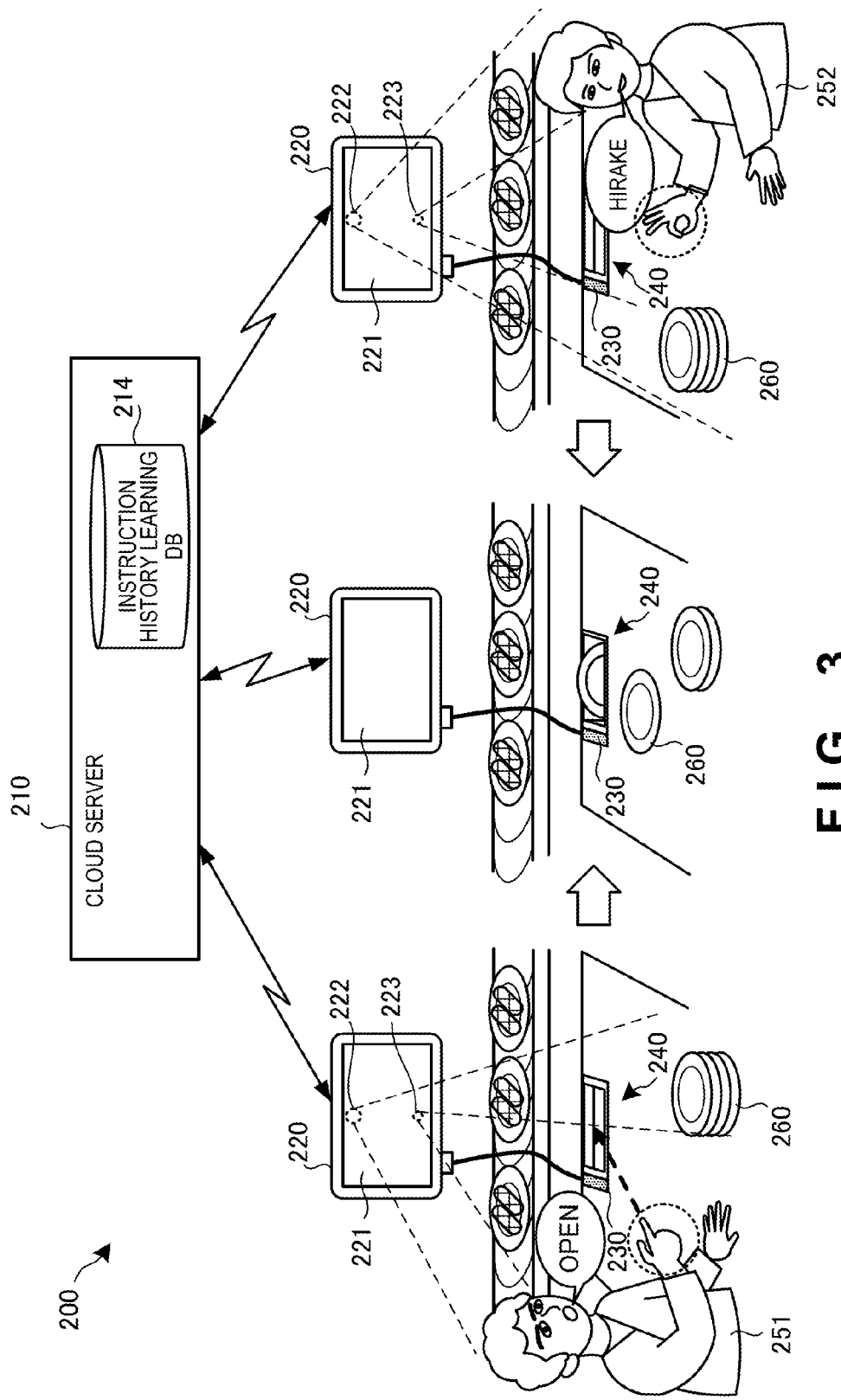
FIG. 3 is a view for explaining the concept of the operation of the information processing system according to the second embodiment of the present invention.

FIG. 3 is a view for explaining the concept of the operation of the information processing system 200 according to this embodiment.

FIG. 3 shows a case in which when each of workers 251 and 252 of a conveyor belt sushi restaurant gives an instruction to drive the plate insertion port driver 230 to open the plate insertion port 240 by a voice instruction and operation instruction (motion or gesture), the cloud server 210 recognizes instruction contents, and drives the plate insertion port driver 230. The left and right views of FIG. 3 show the voice instructions and operation instructions by the workers 251 and 252, and the central view of FIG. 3 shows a state in which the plate insertion port driver 230 is driven to open the plate insertion port 240.

In the left view, the worker 251 issues a voice instruction "OPEN" in English, and issues an operation instruction of pointing the plate insertion port 240 by the index finger. The camera 222 of the order tablet 220 for capturing the worker 251 captures the video of the operation of the worker 251 who points the plate insertion port 240. The microphone 223 of the order tablet 220 for acquiring the voice of the worker 251 acquires the voice "OPEN" of the worker 251. The order tablet 220 transmits the captured video of the operation of the worker 251 and the voice "OPEN" to the cloud server 210. The cloud server 210 recognizes that the worker 251 gives an instruction to open the plate insertion port 240 by referring to the instruction history learning database 214 that accumulates the history of pieces of past instruction information and recognition results. As shown in the central view, the cloud server 210 drives the plate insertion port driver 230 to open the plate insertion port 240 via the order tablet 220 which has acquired the instruction of the worker 251, thereby inserting a plate 260.

On the other hand, the worker 252 issues a voice instruction "HIRAKE" in Japanese, and issues an operation instruction by making a circle with the thumb and index finger. The camera 222 of the order tablet 220 for capturing the worker 252 captures the video of the operation of the worker 252 who makes a circle with the thumb and index finger. The microphone 223 of the order tablet 220 for acquiring the voice of the worker 252 acquires the voice "HIRAKE". The order tablet 220 transmits the captured video of the operation of the worker 252 and the voice "HIRAKE" to the cloud server 210. The cloud server 210 recognizes that the worker 252 gives an instruction to open the plate insertion port 240 by referring to the instruction history learning database 214 that accumulates the history of the pieces of past instruction information and recognition results. As shown in the central view, the cloud server 210 drives the plate insertion port driver 230 to open the plate insertion port 240 via the order tablet 220 which has acquired the instruction of the worker 252, thereby inserting the plate 260.

The instruction history learning database 214 of the cloud server 210 accumulates an instruction history so as to determine, based on the instruction information of each of the voice instruction and operation instruction of the worker 251 or 252, a search range within which the user instruction is searched for. As a simple example, if a scene in which an instruction is issued is recognized as a scene in which the worker puts plates away from a table in the conveyor belt sushi restaurant, a search range by a voice or video is narrowed down to the instruction contents of the worker in the scene. Alternatively, if a language is recognized based on the words of the worker to determine the nationality, use language, race, and the like of the worker, the search range of the operation instruction (motion or gesture) of the worker is narrowed down to a search range for recognizing an operation characteristic to the nationality, use language, race, and the like. Alternatively, if the nationality, race, or expression method of the worker is determined based on the operation instruction (motion or gesture) or face video of the worker, the search range of the voice instruction of the worker is narrowed down to a search range for recognizing a voice characteristic to the nationality, race, and the like.

The cloud server 210 according to this embodiment accumulates voice instructions and operation instructions of other nationalities/races in various scenes in the world, and can quickly and accurately recognize an instruction by determining each search range for instruction recognition based on transmission of voice instructions and operation instructions from communication terminals all over the world. Furthermore, the instruction history learning database 214 of the cloud server 210 accumulates data for a case in which acquired voice and operation instructions do not match an instruction of a recognition result. If the appearance count of the mismatch exceeds a threshold, the recognition result is added to the search ranges for recognizing the voice and operation instructions. Accepting an instruction of a user who remembers an erroneous word and operation allows flexible instruction recognition.

Note that FIG. 3 shows no operation instruction of the worker using the touch panel 221 for the sake of simplicity. However, this embodiment also includes an operation instruction from the touch panel 221 (see FIGS. 15 and 18).

(Operation Procedure)

Figure 4:
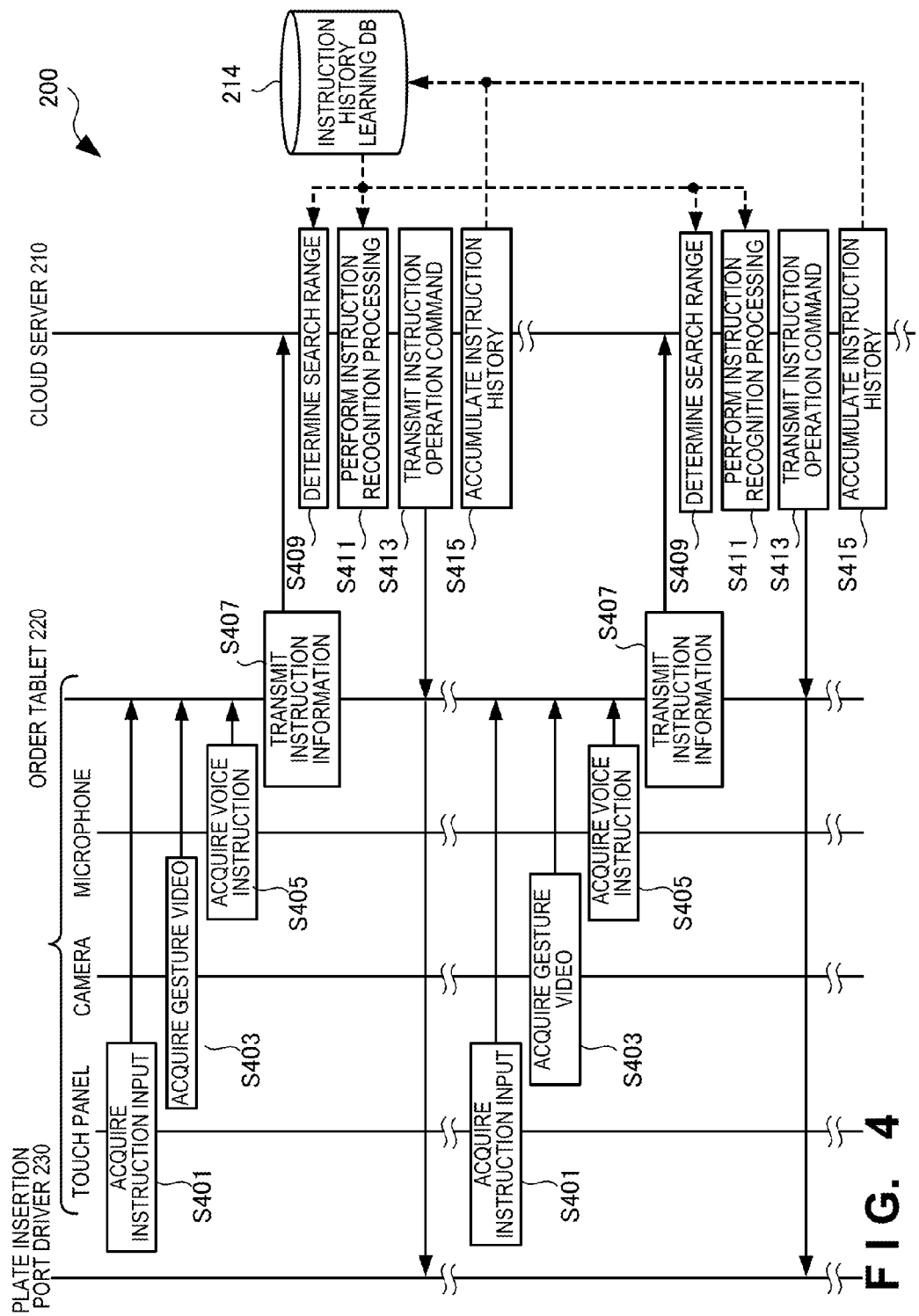
FIG. 4 is a sequence chart showing the operation procedure of the information processing system according to the second embodiment of the present invention.

FIG. 4 is a sequence chart showing the operation procedure of the information processing system 200 according to this embodiment.

In step S401, the instruction input of the user or worker is acquired from the touch panel 221 of the order tablet 220. In step S403, the gesture video of the user or worker is acquired from the camera 222 of the order tablet 220. In step S405, the voice instruction of the user or worker is acquired from the microphone 223 of the order tablet 220. In step S407, the order tablet 220 transmits the acquired instruction information (including instruction voice information and instruction operation information) to the cloud server 210. Note that FIG. 4 shows the instruction input from the touch panel 221, the gesture video from the camera 222, and the voice instruction from the microphone 223. However, at least two of the above acquired data need only be combined, and the acquisition order is not limited to that in FIG. 4. As in this example, if the instruction is an instruction to the plate insertion port driver 230 connected to the order tablet 220, information about a device as the instruction target of the user is also transmitted.

Upon receiving the pieces of instruction information, in step S409 the cloud server 210 determines the search range of each of the pieces of instruction information by referring to the instruction history learning database 214. Determining the search range includes narrowing down the search range and extending the search range, as described with reference to FIG. 3. In step S411, the cloud server 210 performs instruction recognition processing within the determined search range by referring to the instruction history learning database 214. In step S413, the cloud server 210 generates an operation command according to a recognized instruction, and transmits the generated operation command to the device via the order tablet 220. Note that in this embodiment, the device is the plate insertion port driver 230, and the instruction operation command is a driving command to the plate insertion port driver 230 to open the plate insertion port 240. In step S415, the instruction information and the recognition result are accumulated in the instruction history learning database 214 in association with each other, and are referred to in subsequent search range determination processing and instruction recognition processing.

After that, when another worker or the like issues an instruction, it is possible to repeat steps S401 to S415, as described above, thereby more quickly and reliably recognizing instruction contents based on the instruction information by referring to the instruction history learning database 214.

<<Functional Arrangement of Cloud Server>>

Figure 5:
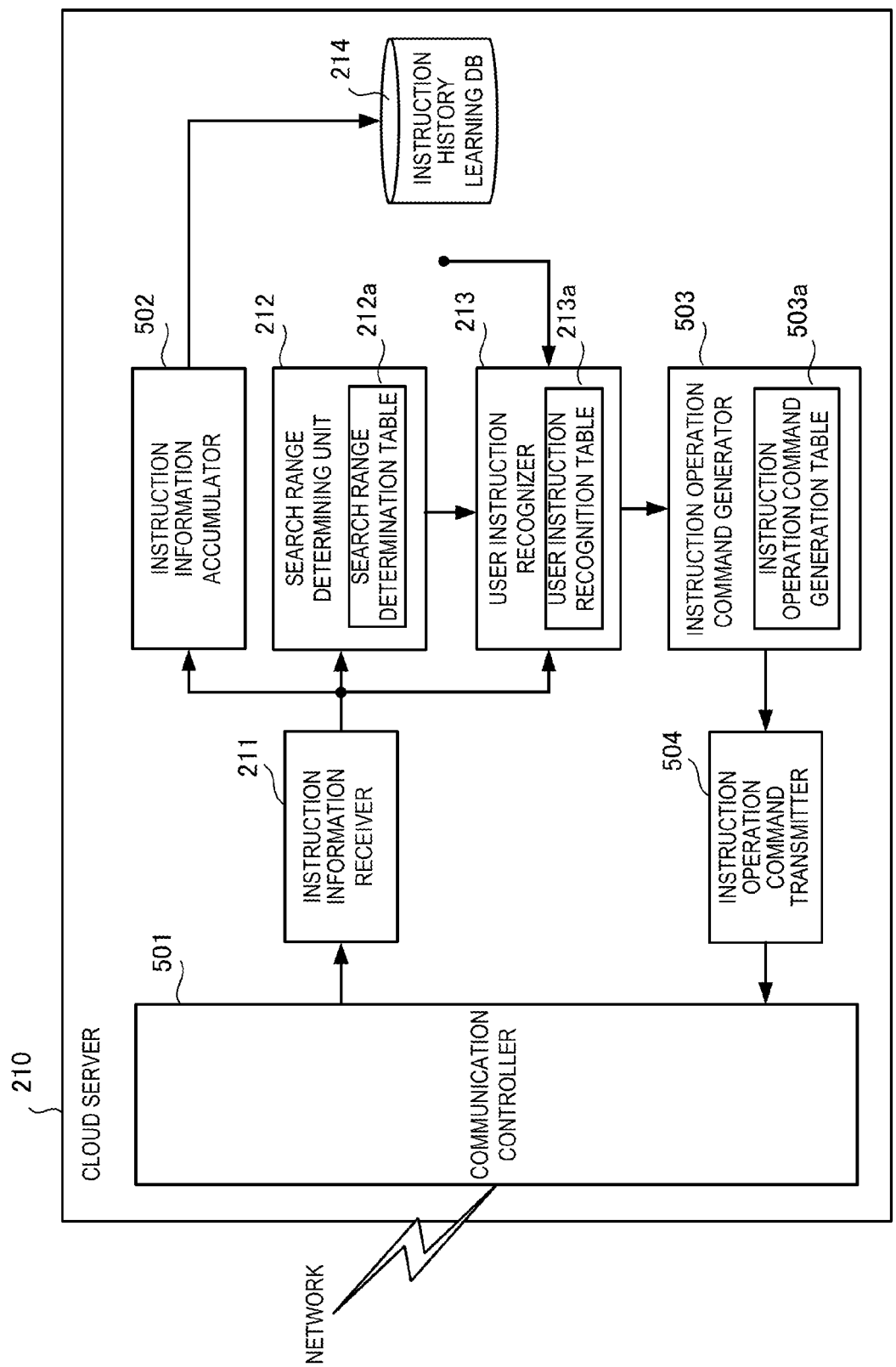
FIG. 5 is a block diagram showing the functional arrangement of a cloud server according to the second embodiment of the present invention.

FIG. 5 is a block diagram showing the functional arrangement of the cloud server 210 according to this embodiment. In fact, an arrangement for user registration and the like is also included. The arrangement, however, will be omitted in order to avoid cumbersomeness in FIG. 5.

The cloud server 210 includes a communication controller 501 that communicates with the order tablet 220 via the network 250. From a message received by the communication controller 501 from the order tablet 220, an instruction information receiver 211 receives instruction information acquired from the touch panel 221, camera 222, or microphone 223 of the order tablet 220. An instruction information accumulator 502 accumulates the instruction information received by the instruction information receiver 211 in the instruction history learning database 214 (see FIG. 7).

The search range determining unit 212 includes a search range determination table 212a (see FIG. 9A), and determines, based on one of the pieces of instruction information received by the instruction information receiver 211, search ranges for instruction recognition of the remaining ones of the pieces of instruction information by referring to the instruction history learning database 214. The user instruction recognizer 213 includes a user instruction recognition table 213a (see FIG. 9C), and combines the pieces of instruction information received by the instruction information receiver 211 to search the search range determined by the search range determining unit 212 by referring to the instruction history learning database 214, thereby recognizing a user instruction.

An instruction operation command generator 503 includes an instruction operation command generation table 503a (see FIG. 10), and generates an instruction operation command according to the user instruction recognized by the user instruction recognizer 213. An instruction operation command transmitter 504 transmits the instruction operation command generated by the instruction operation command generator 503 to the plate insertion port driver 230 via the order tablet 220.

<<Functional Arrangement of Order Tablet>>

Figure 6:
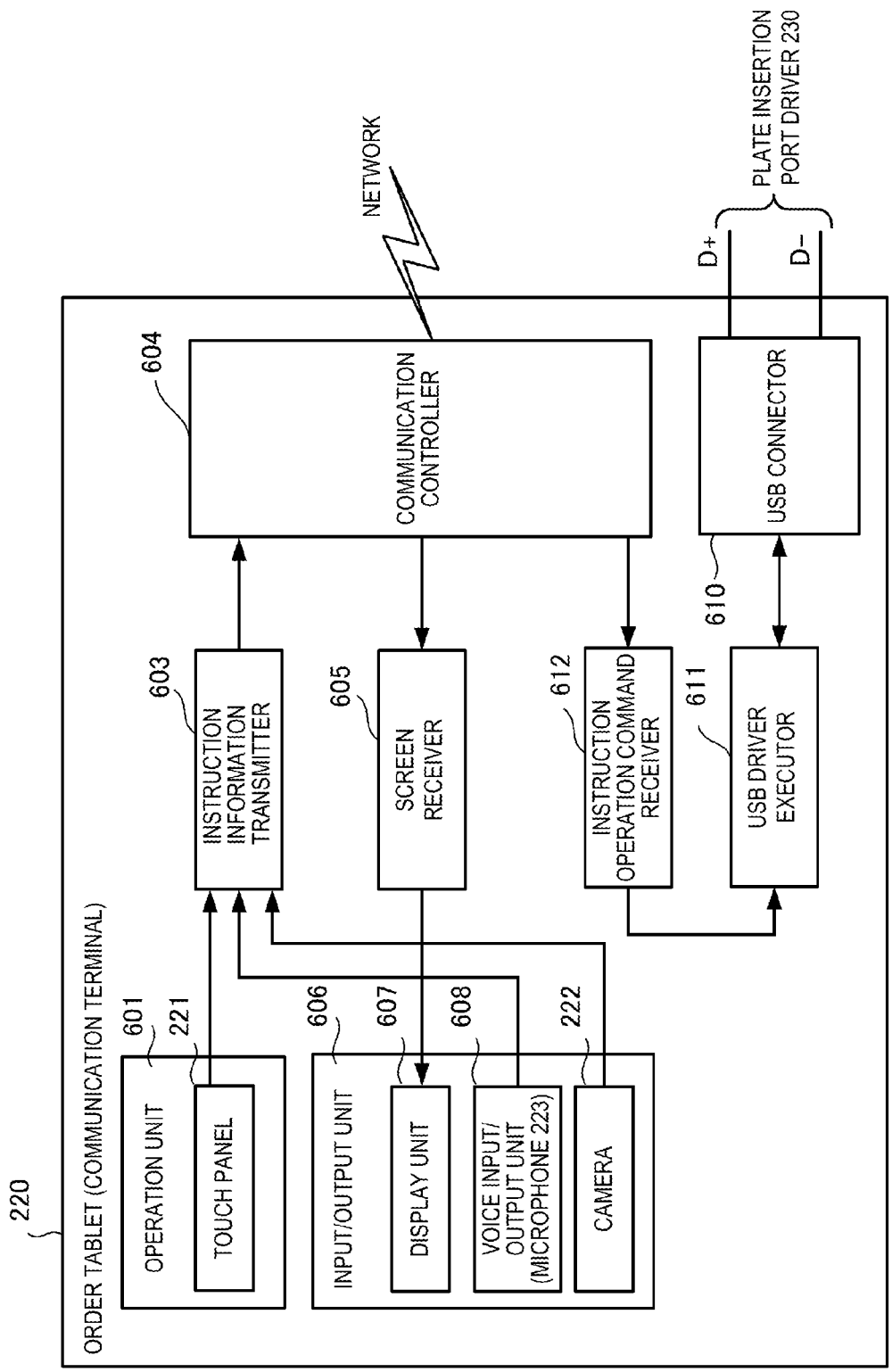
FIG. 6 is a block diagram showing the functional arrangement of an order tablet according to the second embodiment of the present invention.

FIG. 6 is a block diagram showing the functional arrangement of the order tablet 220 according to this embodiment.

The order tablet 220 as a communication terminal according to this embodiment includes a communication controller 604 that controls communication with the cloud server 210 via the network. The order tablet 220 includes an operation unit 601 formed from the touch panel 221, and an input/output unit 606. The input/output unit 606 includes a display unit 607 that displays a screen received by a screen receiver 605 from the cloud server 210 or the order input screen of the order tablet 220, a voice input/output unit 608 that includes the microphone 223 serving as a voice detector and inputs/outputs a voice, and the camera 222 serving as an operation detector. The order tablet 220 also includes an instruction information transmitter 603 that transmits a plurality of pieces of instruction information to the cloud server 210.

Furthermore, the order tablet 220 includes a USB connector 610 to which the plate insertion port driver 230 is USB-connected. An instruction operation command receiver 612 receives an instruction operation command according to the instruction information of the recognition result from the cloud server 210 via the communication controller 604. A USB driver executor 611 serving as an operation command output unit transmits the instruction operation command to the plate insertion port driver 230 via the USB connector 610. Note that FIG. 6 shows the USB connection via the USB connector 610. The present invention, however, is not limited to this.

(Instruction History Learning Database)

Figure 7:
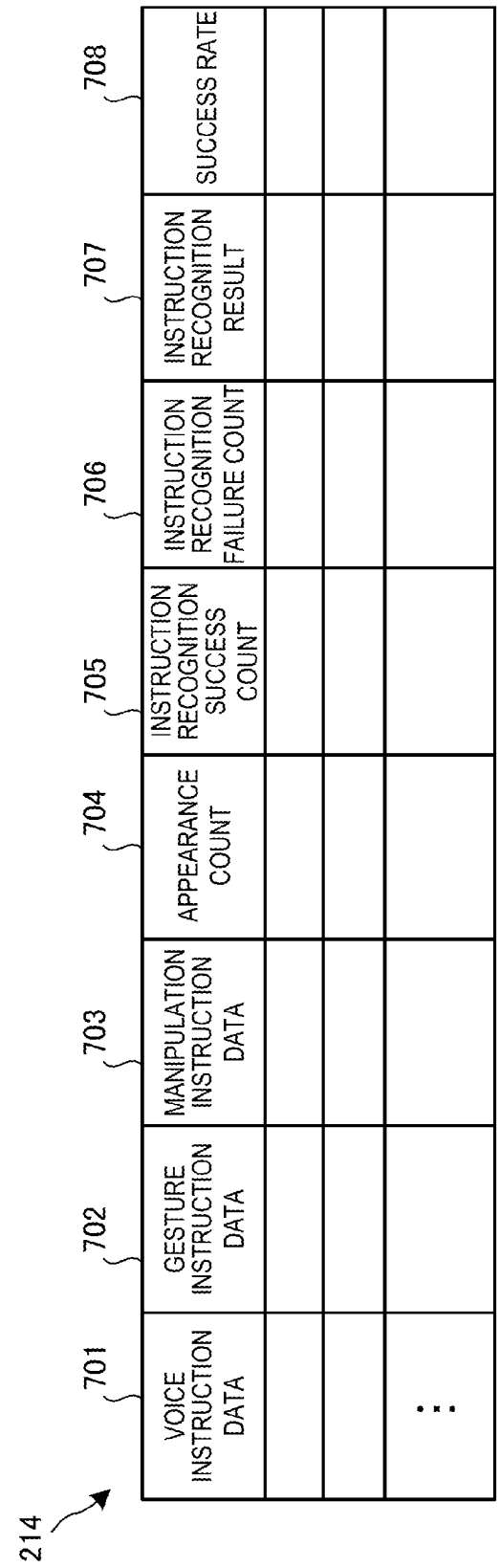
FIG. 7 is a table showing the structure of an instruction history learning database according to the second embodiment of the present invention.

FIG. 7 is a table showing the structure of the instruction history learning database 214 according to this embodiment. Note that the structure of the instruction history learning database 214 is not limited to that shown in FIG. 7.

The instruction history learning database 214 accumulates the following data in association with voice instruction data 701 acquired by the microphone 223, gesture instruction data 702 acquired by the camera 222, and manipulation instruction data 703 acquired by the touch panel 221. The accumulated data store an appearance count 704 of a corresponding combination, an instruction recognition success count 705 of a case in which an instruction recognition result matches the instruction, an instruction recognition failure count 706 of a case in which an instruction recognition result does not match the instruction, an instruction recognition result 707, and an instruction recognition success rate 708.

<<Hardware Arrangement of Cloud Server>>

Figure 8:
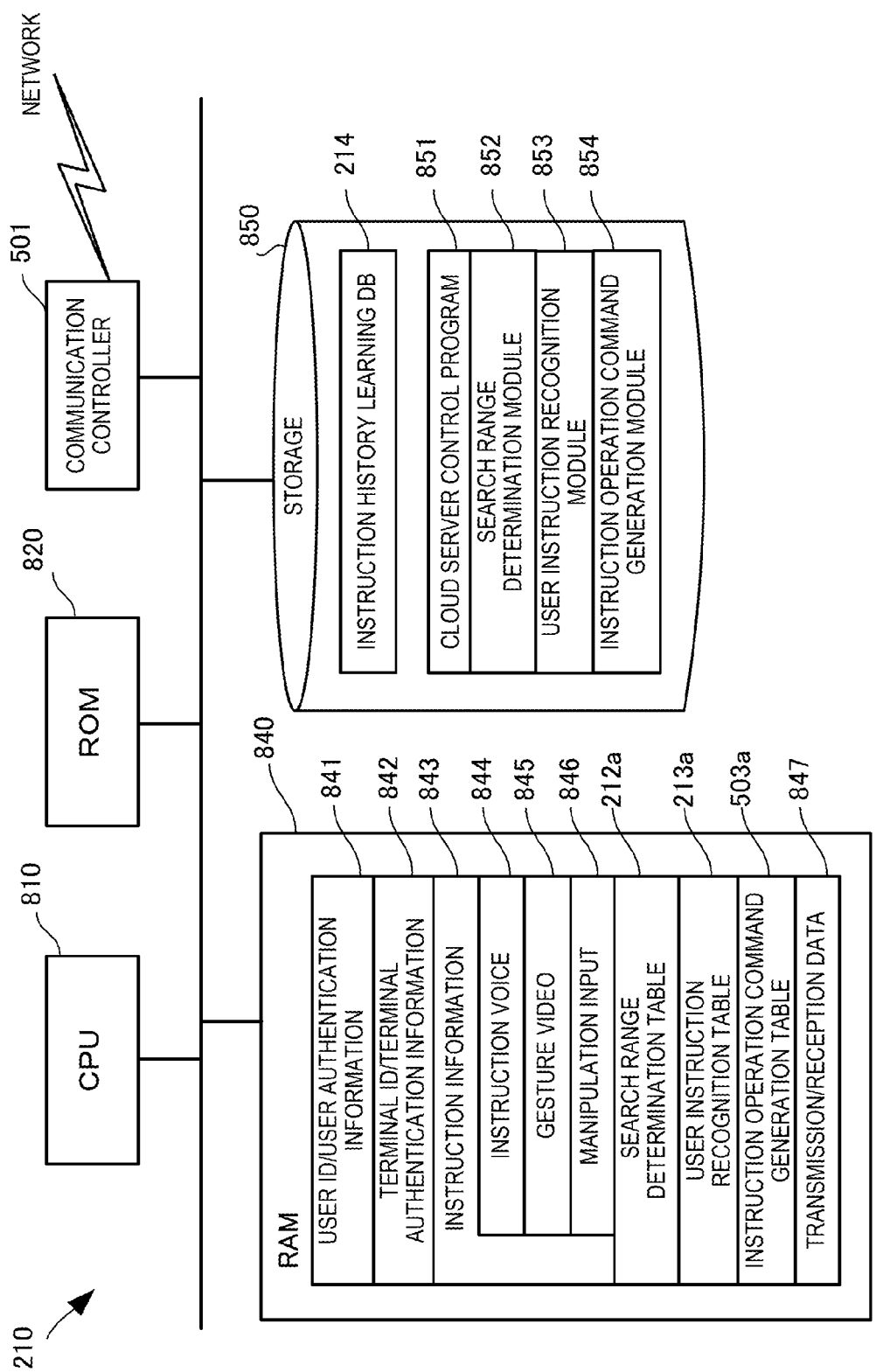
FIG. 8 is a block diagram showing the hardware arrangement of the cloud server according to the second embodiment of the present invention.

FIG. 8 is a block diagram showing the hardware arrangement of the cloud server 210 according to this embodiment.

In FIG. 8, a CPU (Central Processing Unit) 810 is a calculation control processor, and implements each functional component of the cloud server 210 shown in FIG. 5 by executing a program. A ROM (Read Only Memory) 820 stores programs and permanent data such as initial data and programs. The communication controller 501 is a communication controller that communicates with the order tablet 220 via the network 250 in this embodiment. Note that the number of CPUs 810 is not limited to one, and a plurality of CPUs may be included or a GPU (Graphics Processing Unit) for image processing may be included.

A RAM (Random Access Memory) 840 is a random access memory used as a work area by the CPU 810 to temporarily store data. In the RAM 840, an area for storing data necessary for implementing this embodiment is reserved. User ID/user authentication information 841 includes the identifier and authentication information of the user who currently performs communication. Terminal ID/terminal authentication information 842 includes the identifier and authentication information of a portable terminal that currently performs communication. Instruction information 843 is information received from the order tablet 220, and includes one of an instruction voice 844, a gesture video 845, and a manipulation input 846. The search range determination table 212a is a table used by the search range determining unit 212 to determine a search range (see FIG. 9A). The user instruction recognition table 213a is a table used by the user instruction recognizer 213 to recognize a user instruction (see FIG. 9C). The instruction operation command generation table 503a is a table used by the instruction operation command generator 503 to generate an instruction operation command according to the recognition result of the user instruction (see FIG. 10). Transmission/reception data 847 are data to be transmitted/received to/from the order tablet 220 via the communication controller 501.

A storage 850 stores databases and various parameters, or the following data or programs necessary for implementing this embodiment. The instruction history learning database 214 is the database shown in FIG. 7. The storage 850 stores the following programs. A cloud server control program 851 is a program for controlling the cloud server 210 as a whole. A search range determination module 852 is a module that determines a search range for recognizing each piece of instruction information in the cloud server control program 851 (see FIG. 12A). A user instruction recognition module 853 is a module that recognizes a user instruction within the determined search range in the cloud server control program 851 (see FIG. 12B). An instruction operation command generation module 854 is a module that generates an instruction operation command according to the recognized user instruction in the cloud server control program 851.

Note that in the RAM 840 and storage 850 of FIG. 8, data and programs associated with the general-purpose functions and other feasible functions of the cloud server 210 are not shown.

(Search Range Determination Table)

FIG. 9A is a view showing the structure of the search range determination table 212*a* according to this embodiment. The search range determination table 212*a* is used by the search range determining unit 212 to determine a search range by referring to the instruction history learning database 214 based on instruction information.

The search range determination table 212*a* includes a search range determination table 910 for a voice instruction, a search range determination table 920 for a gesture video, and a search range determination table 930 for a manipulation input. The search range determination table 910 for a voice instruction is used to determine the search range of a gesture video and that of a manipulation input based on a voice instruction. The search range determination table 920 for a gesture video is used to determine the search range of a voice instruction and that of a manipulation input based on a gesture video. The search range determination table 930 for a manipulation input is used to determine the search range of a voice instruction and that of a gesture video based on a manipulation input.

The search range determination table 910 for a voice instruction stores the search range, the outside of the search range, or the additional search range of a gesture video 912 in association with a received voice, a recognized language, or another attribute in a voice instruction 911. The table 910 also stores the search range, the outside of the search range, or the additional search range of a manipulation input 913. The search range determination table 920 for a gesture video stores the search range, the outside of the search range, or the additional search range of a voice instruction 922 in association with a received video, a recognized nationality, or another attribute in a gesture video 921. The table 920 also stores the search range, the outside of the search range, or the additional search range of a manipulation input 923. The search range determination table 930 for a manipulation input stores the search range, the outside of the search range, or the additional search range of a voice instruction 932 in association with a received manipulation, a recognized scene, or another attribute in a manipulation input 931. The table 930 also stores the search range, the outside of the search range, or the additional search range of a gesture video 933.

(User Attributes)

Figure 9B:
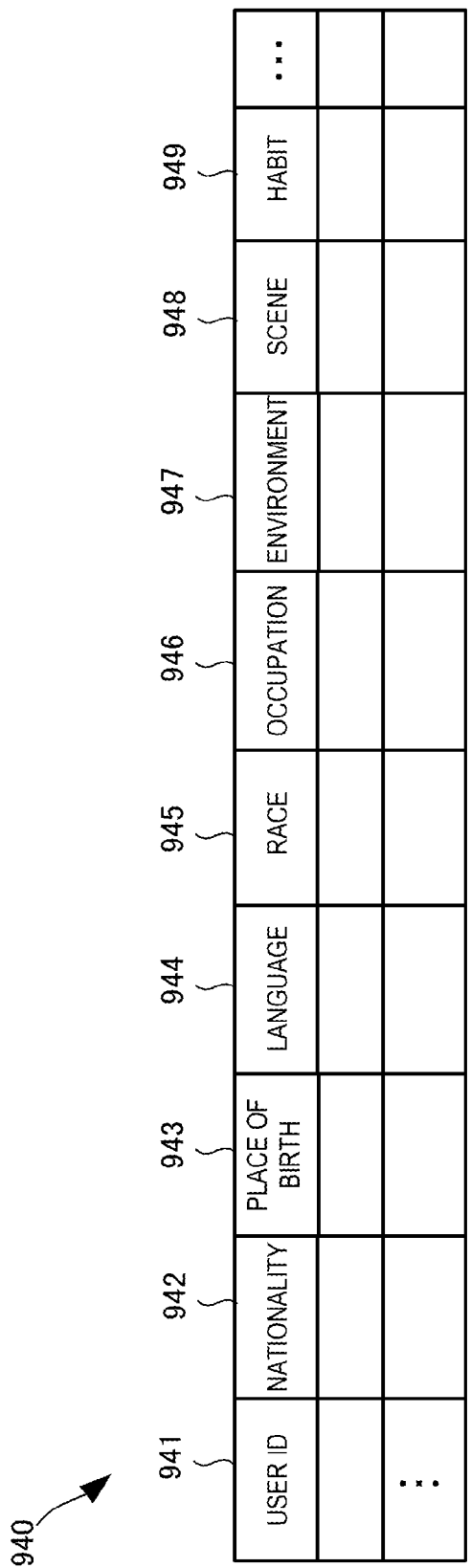
FIG. 9B is a table showing user attributes according to the second embodiment of the present invention.

FIG. 9B is a table showing user attributes 940 according to this embodiment. FIG. 9A described above representatively shows a recognized language from a received voice, a recognized nationality from a received video, and a recognized scene from a received manipulation as information for determining a search range. However, it is possible to use other information as information for determining a search range. FIG. 9B shows examples of the user attributes as usable pieces of information. Note that the information for determining a search range is not limited to the user attributes.

The user attributes 940 include a nationality 942 of the user, a place of birth 943 of the user, a spoken language 944 of the user, a race 945 of the user, an occupation 946 of the user, an environment 947 of the user, a scene 948 which the user has encountered, and a habit 949 of the user in association with a user ID 941. Furthermore, the dialect and the like of the user may be included as the user attributes 940 or the habit 949 of the user.

(User Instruction Recognition Table)

FIG. 9C is a table showing the structure of the user instruction recognition table 213*a* according to this embodiment. The user instruction recognition table 213*a* is used by the user instruction recognizer 213 to recognize a user instruction within the search range determined by the search range determining unit 212.

The user instruction recognition table 213*a* stores the received voice, search range, and instruction prediction of a voice instruction 951, the received video, search range, and instruction prediction of a gesture video 952, and the received manipulation, search range, and instruction prediction of a manipulation input 953. Based on the instruction predictions, an instruction recognition result 954 and a success rate 955 are stored.

(Instruction Operation Command Generation Table)

Figure 10:
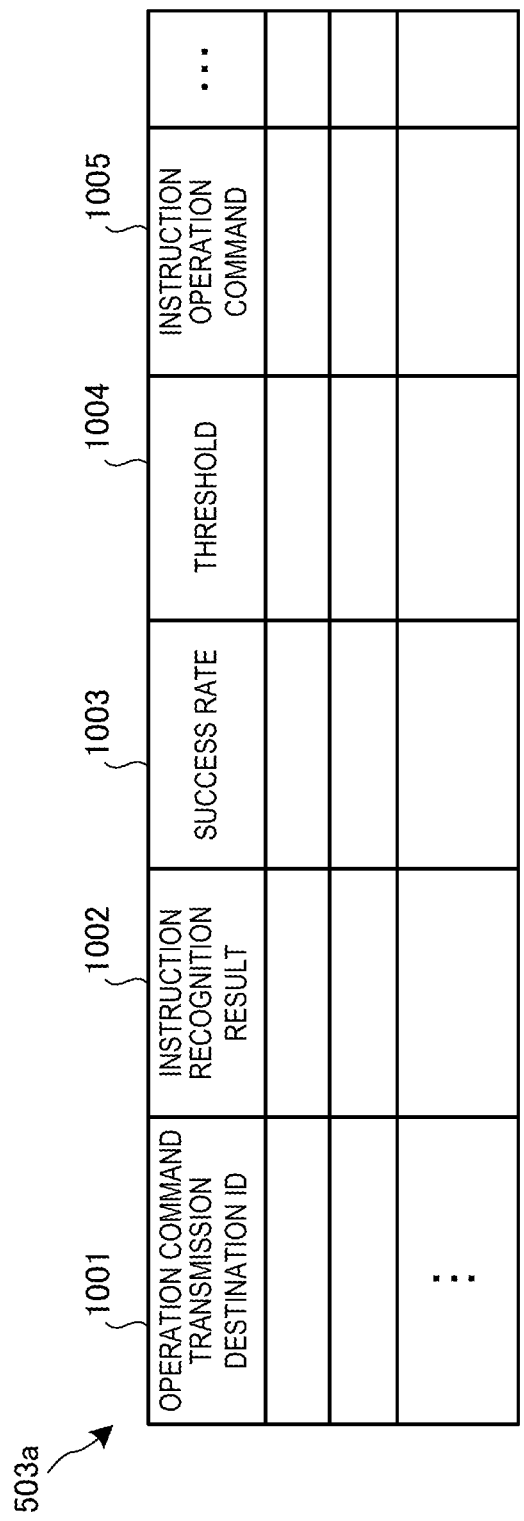
FIG. 10 is a table showing the structure of an instruction operation command generation table according to the second embodiment of the present invention.

FIG. 10 is a table showing the structure of the instruction operation command generation table 503*a* according to this embodiment. The instruction operation command generation table 503*a* is used by the instruction operation command generator 503 to generate an instruction operation command according to the recognition result of the user instruction recognizer 213.

The instruction operation command generation table 503*a* stores, in association with an operation command transmission destination ID 1001, an instruction recognition result 1002, a success rate 1003, a threshold 1004 for determining the success rate of the instruction recognition result 1002, and an instruction operation command 1005 generated when the success rate 1003 exceeds the threshold 1004. Note that the operation command transmission destination ID 1001 includes the ID of the order tablet 220 or the ID of the plate insertion port driver 230.

<<Processing Procedure of Cloud Server>>

Figure 11:
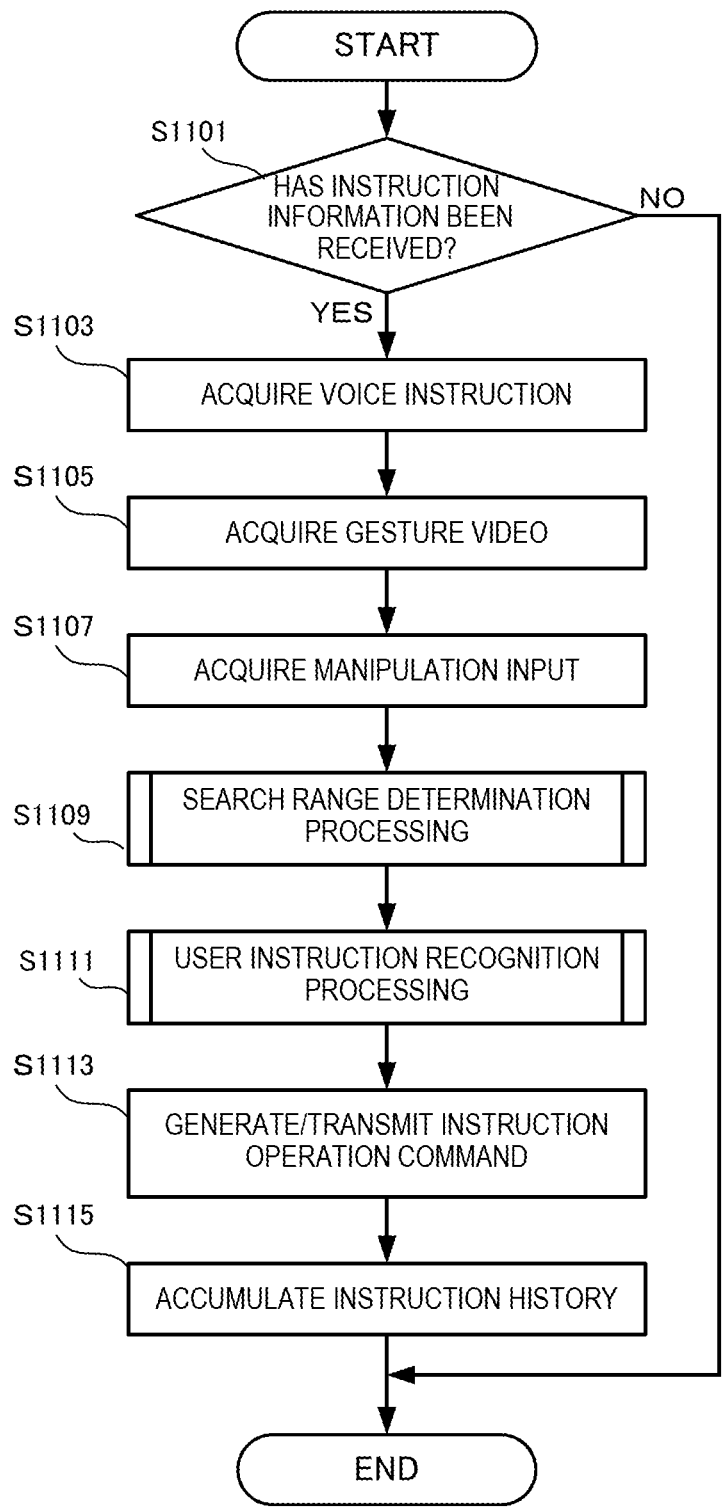
FIG. 11 is a flowchart illustrating the processing procedure of the cloud server according to the second embodiment of the present invention.

FIG. 11 is a flowchart illustrating the processing procedure of the cloud server 210 according to this embodiment. The flowchart is executed by the CPU 810 of FIG. 8 using the RAM 840, thereby implementing each functional component of FIG. 5.

The cloud server 210 determines in step S1101 whether instruction information has been received from the order tablet 220. If no instruction information has been received, another processing is performed. If instruction information has been received, the process advances to step S1103, and the cloud server 210 acquires a voice instruction from the received instruction information. In step S1105, the cloud server 210 acquires a gesture video from the received instruction information. In step S1107, the cloud server 210 acquires a manipulation input from the received instruction information.

Figure 12B:
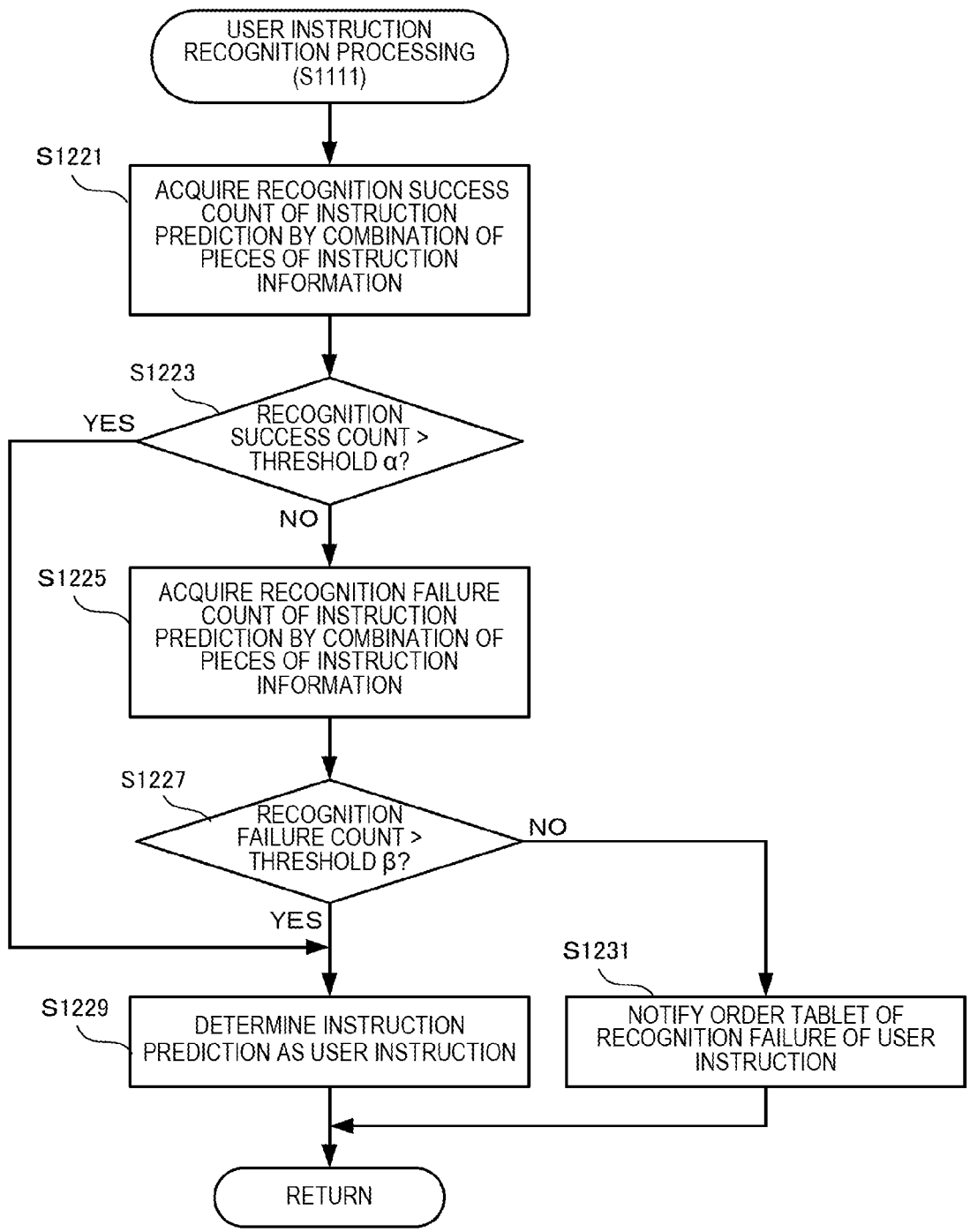
FIG. 12B is a flowchart illustrating the processing procedure of user instruction recognition processing according to the second embodiment of the present invention.

In step S1109, based on each of the acquired pieces of instruction information, the cloud server 210 performs search range determination processing of the remaining pieces of instruction information (see FIG. 12A). Subsequently, in step S1111, the cloud server 210 makes a search within a search range determined by the search range determination processing, thereby executing user instruction recognition processing (see FIG. 12B).

After that, in step S1113, the cloud server 210 generates an instruction operation command according to the recognition result of the user instruction recognition processing, and transmits the generated instruction operation command to its transmission destination. The cloud server 210 accumulates, as an instruction history, the received instruction information and the determined search range, the user instruction as a recognition result, and the corresponding instruction operation command in association with each other in the instruction history learning database 214

(Search Range Determination Processing)

FIG. 12A is a flowchart illustrating the processing procedure of search range determination processing S1109-1 according to this embodiment. The search range determination processing S1109-1 of FIG. 12A shows a case in which a manipulation input is not limited the operation input of the user on the touch panel. Note that although user attributes are used to determine a search range in FIG. 12A, the present invention is not limited to this.

In step S1211, the cloud server 210 acquires user attributes from the voice instruction, gesture video, and manipulation input. In step S1213, the cloud server 210 sets the search range of the voice instruction, gesture video, or manipulation input based on the acquired user attributes. In step S1215, the cloud server 210 sets the non-search range of the voice instruction, gesture video, or manipulation input based on the acquired user attributes. In step S1217, the cloud server 210 adds the search range of the voice instruction, gesture video, or manipulation input by referring to the instruction history learning database 214. That is, if the user or worker repeats the same mistake, the cloud server 210 performs processing of recognizing the mistake as a user instruction based on instruction history learning.

(User Instruction Recognition Processing)

FIG. 12B is a flowchart illustrating the processing procedure of user instruction recognition processing S1111 according to this embodiment.

In step S1221, the cloud server 210 acquires the recognition success count of an instruction prediction by a combination of the pieces of instruction information. In step S1223, the cloud server 210 determines whether the recognition success count exceeds a threshold α. If the recognition success count exceeds the threshold α, the process advances to step S1229, and the cloud server 210 determines the instruction prediction as a user instruction.

On the other hand, if the recognition success count does not exceed the threshold α, the process advances to step S1225, and the cloud server 210 acquires the recognition failure count of the instruction prediction by the combination of the pieces of instruction information. In step S1227, the cloud server 210 determines whether the recognition failure count exceeds a threshold β. If the recognition failure count exceeds the threshold β, the process advances to step S1229, and the cloud server 210 determines, as a user instruction, the instruction prediction which has failed to be recognized.

If the recognition failure count does not exceed the threshold β, the process advances to step S1231, and the cloud server 210 notifies the order tablet 220 of the recognition failure of the user instruction.

<<Hardware Arrangement of Order Tablet>>

Figure 13:
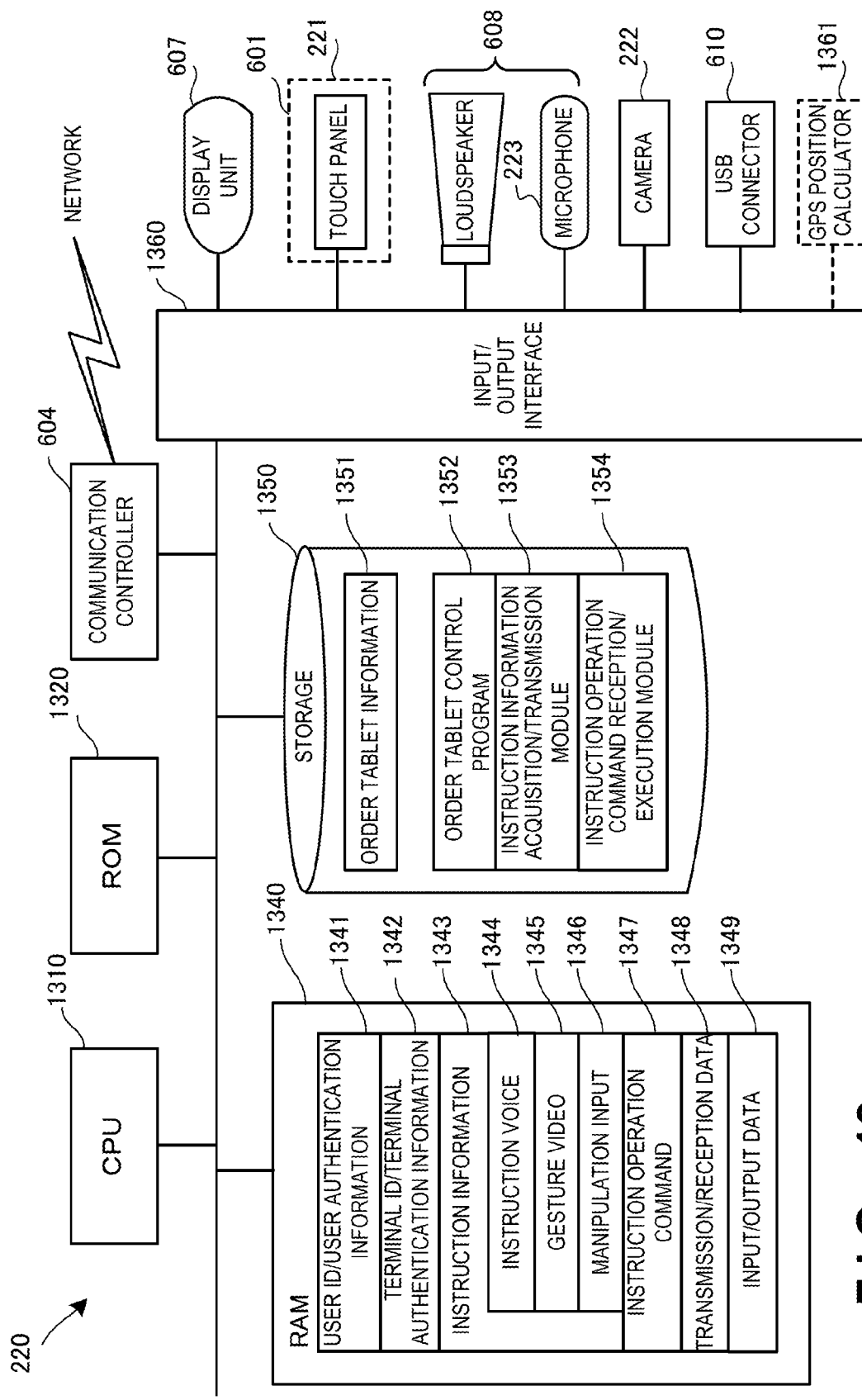
FIG. 13 is a block diagram showing the hardware arrangement of the order tablet according to the second embodiment of the present invention.

FIG. 13 is a block diagram showing the hardware arrangement of the order tablet 220 according to this embodiment.

Referring to FIG. 13, a CPU 1310 is a calculation control processor, and implements each functional component of the order tablet 220 of FIG. 6 by executing a program. A ROM 1320 stores programs and permanent data such as initial data and programs. The communication controller 604 is a communication controller that communicates with the cloud server 210 via the network in this embodiment. Note that the number of CPUs 1310 is not limited to one, and a plurality of CPUs may be included or a GPU for image processing may be included.

A RAM 1340 is a random access memory used as a work area by the CPU 1310 to temporarily store data. In the RAM 1340, an area for storing data necessary for implementing this embodiment is reserved. User ID/user authentication information 1341 includes the identifier and authentication information of the user who currently uses the order tablet 220. Terminal ID/terminal authentication information 1342 includes the identifier and authentication information of the order tablet 220. Instruction information 1343 is information acquired via each instruction information input unit and transmitted to the cloud server 210, and includes one of an instruction voice 1344, a gesture video 1345, and a manipulation input 1346. An instruction operation command 1347 is an operation command according to a user instruction, which has been received from the cloud server 210. Transmission/reception data 1348 are data to be transmitted/received to/from the cloud server 210 via the communication controller 501. Input/output data 1349 indicate input/output data input/output via an input/output interface 1360.

A storage 1350 stores databases and various parameters, or the following data or programs necessary for implementing this embodiment. Order tablet information 1351 is information including the identifier of the order tablet 220. The storage 1350 stores the following programs. An order tablet control program 1352 is a control program for controlling the order tablet 220 as a whole. An instruction information acquisition/transmission module 1353 is a module that acquires instruction information via each instruction information input unit, and transmits the acquired instruction information to the cloud server 210 in the order tablet control program 1352. An instruction operation command reception/execution module 1354 is a module that receives an instruction operation command from the cloud server 210, transmits the received instruction operation command to the plate insertion port driver 230 via the USB connector 610, and executes an instruction operation in the order tablet control program 1352.

The input/output interface 1360 interfaces input/output data with an input/output device. The display unit 607 and the operation unit 601 formed from the touch panel 221 and the like are connected to the input/output interface 1360. The voice input/output unit 608 including a loudspeaker and the microphone 223 is also connected. Furthermore, a GPS position generator 1361, the camera 222, and the like are connected. The USB connector 610 is also connected.

Note that in the RAM 1340 and storage 1350 of FIG. 13, data and programs associated with the general-purpose functions and other feasible functions of the order tablet 220 are not shown.

<<Processing Procedure of Order Tablet>>

Figure 14:
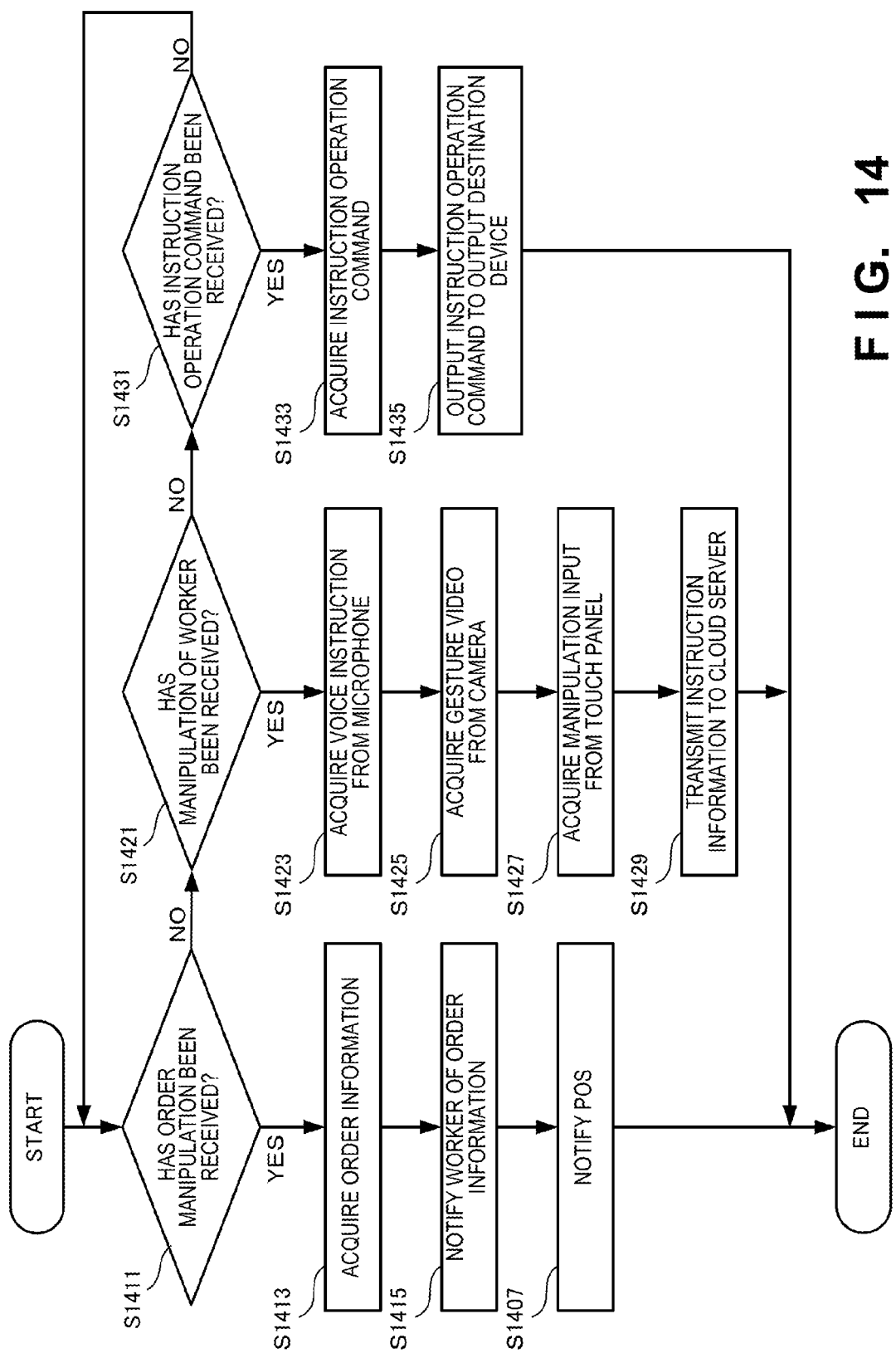
FIG. 14 is a flowchart illustrating the processing procedure of the order tablet according to the second embodiment of the present invention.

FIG. 14 is a flowchart illustrating the processing procedure of the order tablet 220 according to this embodiment. The flowchart is executed by the CPU 1310 of FIG. 13 using the RAM 1340, thereby implementing each functional component of FIG. 6.

In step S1411, the order tablet 220 determines whether an order manipulation of the user has been received from the touch panel 221. If no order manipulation of the user has been received from the touch panel 221, the order tablet 220 determines in step S1421 whether a manipulation of a worker has been received. If no order manipulation of the user has been received from the touch panel 221 and no manipulation of the worker has been received, the order tablet 220 determines in step S1431 whether an instruction operation command has been received from the cloud server 210.

If an order manipulation of the user has been received from the touch panel 221, the process advances to step S1413, and the order tablet 220 acquires order information from the touch panel 221. In step S1415, the order tablet 220 notifies the worker, who performs order processing, of the order information. As for the conveyor belt sushi restaurant of this embodiment, the order tablet 220 notifies a sushi chef of order contents. In step S1407, the order tablet 220 also notifies a POS (Point Of Sale) (not shown) for counting sales of the order information.

If a manipulation of the worker has been received, the process advances to step S1423, and the order tablet 220 acquires a voice instruction from the microphone 223. In step S1425, the order tablet 220 acquires a gesture video from the camera 222. In step S1427, the order tablet 220 acquires a manipulation input from the touch panel 221. Note that the order of steps S1423 to S1427 is arbitrary. In step S1429, the order tablet 220 transmits the acquired instruction information to the cloud server 210.

If an instruction operation command has been received from the cloud server 210, the process advances to step S1433, and the order tablet 220 acquires the instruction operation command. In step S1435, the order tablet 220 outputs the instruction operation command to an output destination device (in this example, the plate insertion port driver 230).

According to this embodiment, since manipulation instruction candidates are searched by narrowing them down to a search range corresponding to the attributes of the user who has issued a manipulation instruction, an enormous number of manipulation instruction candidates including different user attributes can be prepared. Even in this case, it is possible to effectively narrow down manipulation instruction candidates corresponding to the user.

Note that a worker who can read characters may issue an instruction using the touch panel, and only a worker who cannot read characters may issue an instruction by a voice+motion. This embodiment is applicable to other kinds of business. In work by a hotel worker, for example, an input mode may be switched to an input by a voice+motion when he/she holds a tool, and may be switched to an input using the touch panel when he/she moves because he/she can use hands. Furthermore, in a contact center, manipulation input determination by a voice+motion using the above-described cloud server may be performed to facilitate performance of tasks by a person unable to use his/her hand or leg, or a weak-sighted person.

Third Embodiment

An information processing system according to the third embodiment of the present invention will be described. The information processing system according to this embodiment is different from that in the aforementioned second embodiment in that a user operation instruction on the touch panel of an order tablet is used as instruction operation information. Since other components and operations are the same as in the second embodiment, the same reference numerals and symbols denote the same components and operations and a detailed description thereof will be omitted.

According to this embodiment, in addition to an operation instruction by a motion or gesture using a hand or finger, the touch locus of the user on the touch panel can be input as instruction operation information.

<<Concept of Operation of Information Processing System>>

Figure 15:
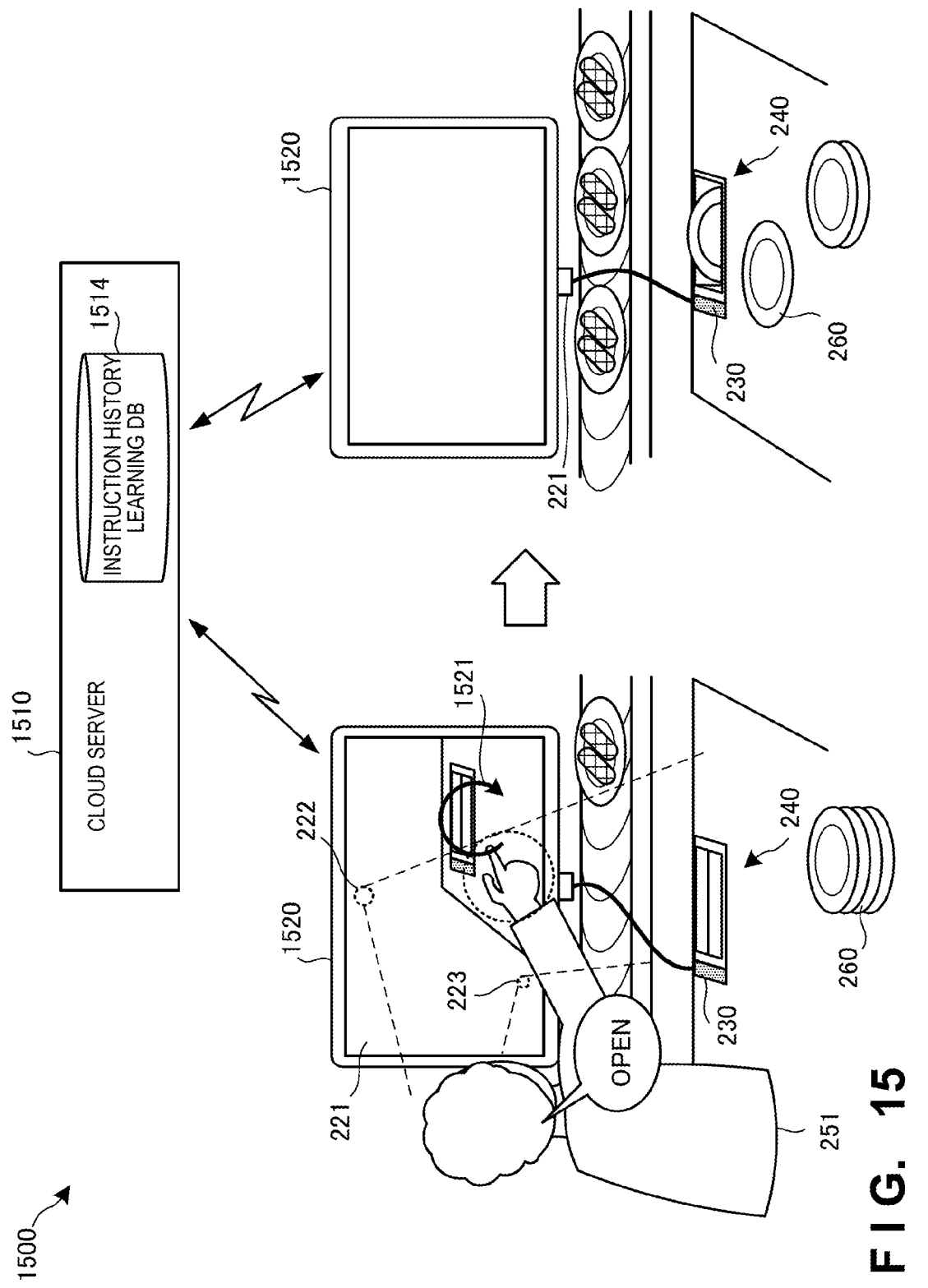
FIG. 15 is a view for explaining the concept of the operation of an information processing system according to the third embodiment of the present invention.

FIG. 15 is a view for explaining the concept of the operation of an information processing system 1500 according to this embodiment.

FIG. 15 shows a case in which when a worker 251 of a conveyor belt sushi restaurant gives an instruction to drive a plate insertion port driver 230 to open a plate insertion port 240 by a voice instruction and operation instruction (an operation instruction on the touch panel of an order tablet 1520), a cloud server 1510 recognizes instruction contents, and drives the plate insertion port driver 230. The left view of FIG. 15 shows the voice instruction and operation instruction by the worker 251, and the right view of FIG. 15 shows a state in which the plate insertion port driver 230 is driven to open the plate insertion port 240.

In the left view, a table captured by the camera 222 is displayed on the display screen of the order tablet 1520. The worker 251 issues a voice instruction "OPEN" in English, and issues an operation instruction of pointing the position of the plate insertion port 240 on the display screen by the index finger. A touch panel 221 of the order tablet 1520 acquires the operation instruction of pointing the plate insertion port 240. FIG. 15 shows an operation 1521 of drawing a circle. A microphone 223 of the order tablet 1520 acquires the voice "OPEN" of the worker 251. The order tablet 1520 transmits the operation instruction on the touch panel 221 and the voice "OPEN" to the cloud server 1510. The cloud server 1510 recognizes that the worker 251 has instructed to open the plate insertion port 240 by referring to an instruction history learning database 1514 for accumulating a history of pieces of past instruction information and recognition results. After that, as shown in the right view, the plate insertion port driver 230 is driven to open the plate insertion port 240 via the order tablet 1520, thereby inserting a plate 260. Note that in this embodiment as well, a search range is determined based on the association between the voice and the shape (circle, triangle, rectangle, or the like) of the operation instruction, similarly to the second embodiment.

Note that the functional arrangement of the cloud server 1510 according to this embodiment is obtained by replacing the instruction history learning database 214 of FIG. 5 by the instruction history learning database 1514. Other components are the same as in the second embodiment, and are thus not shown, and a description thereof will be omitted.

(Instruction History Learning Database)

FIG. 16 is a table showing the structure of the instruction history learning database 1514 according to this embodiment. Note that the structure of the instruction history learning database 1514 is not limited to that shown in FIG. 16.

The instruction history learning database 1514 accumulates the following data in association with a camera video 1601 captured by the camera 222, a display video 1602 on the order tablet 1520, and a voice input 1603 acquired by the microphone 223. The accumulated data store a motion search range 1604 on the touch panel 221 of the order tablet 1520, a motion 1605 on the touch panel 221, an instruction recognition result 1606, and a success rate 1607.

Note that although not shown in FIG. 16, an appearance count, an instruction recognition success count, and an instruction recognition failure count may be stored, as shown in FIG. 7.

(Search Range Determination Processing)

Figure 17:
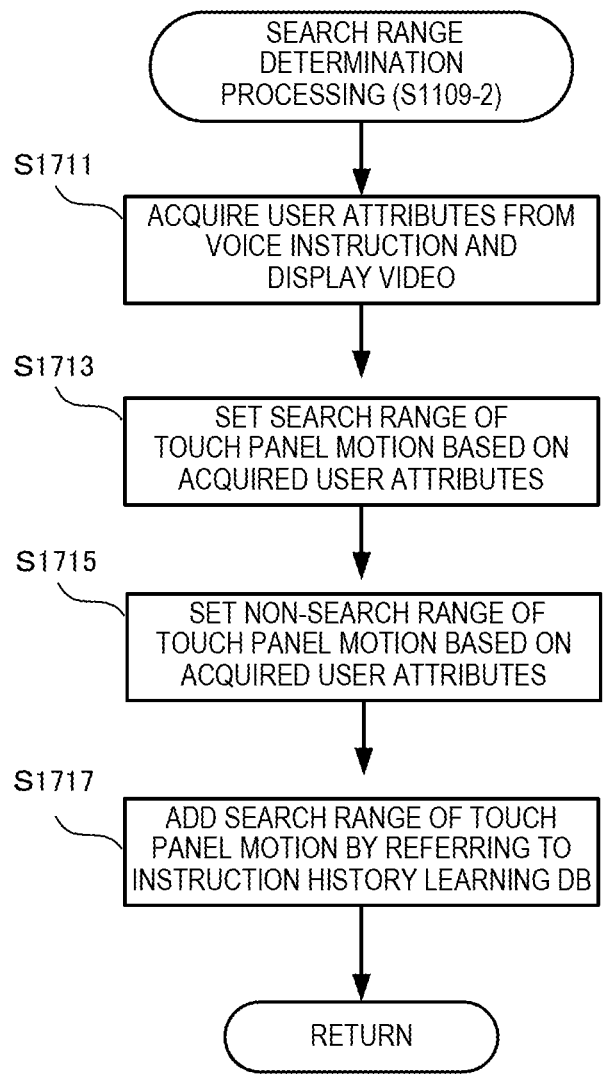
FIG. 17 is a flowchart illustrating the processing procedure of search range determination processing according to the third embodiment of the present invention.

FIG. 17 is a flowchart illustrating the processing procedure of search range determination processing S1109-2 according to this embodiment. The search range determination processing S1109-2 of FIG. 17 is substituted for the search range determination processing S1109-2 of FIG. 12A of the second embodiment.

In step S1711, the cloud server 1510 acquires user attributes from a voice instruction and display video. In step S1713, the cloud server 1510 sets the search range of the touch panel motion based on the acquired user attributes. In step S1715, the cloud server 1510 sets the non-search range of the touch panel motion based on the acquired user attributes. In step S1717, the cloud server 1510 adds the search range of the touch panel motion by referring to the instruction history learning database 1514. That is, if the user or worker repeats the same mistake, the cloud server 1510 performs processing of recognizing the mistake as a user instruction based on instruction history learning.

According to this embodiment, since the touch locus of the user is also stored in the instruction history learning database, it is possible to input the touch locus of the user on the touch panel as instruction operation information in addition to an operation instruction by a motion or gesture using a hand or finger.

Fourth Embodiment

An information processing system according to the fourth embodiment of the present invention will be described. The information processing system according to this embodiment is different from that in the second or third embodiment in that an electronic device in a room is automatically controlled based on instruction voice information and instruction operation information using display of a video of the room captured by the camera of a tablet. Since other components and operations are the same as those in the second embodiment, the same reference numerals and symbols denote the same components and operations, and a detailed description thereof will be omitted.

According to this embodiment, it is possible to instruct to automatically control an electronic device in a room by combining instruction voice information and instruction operation information.

<<Concept of Operation of Information Processing System>>

Figure 18:
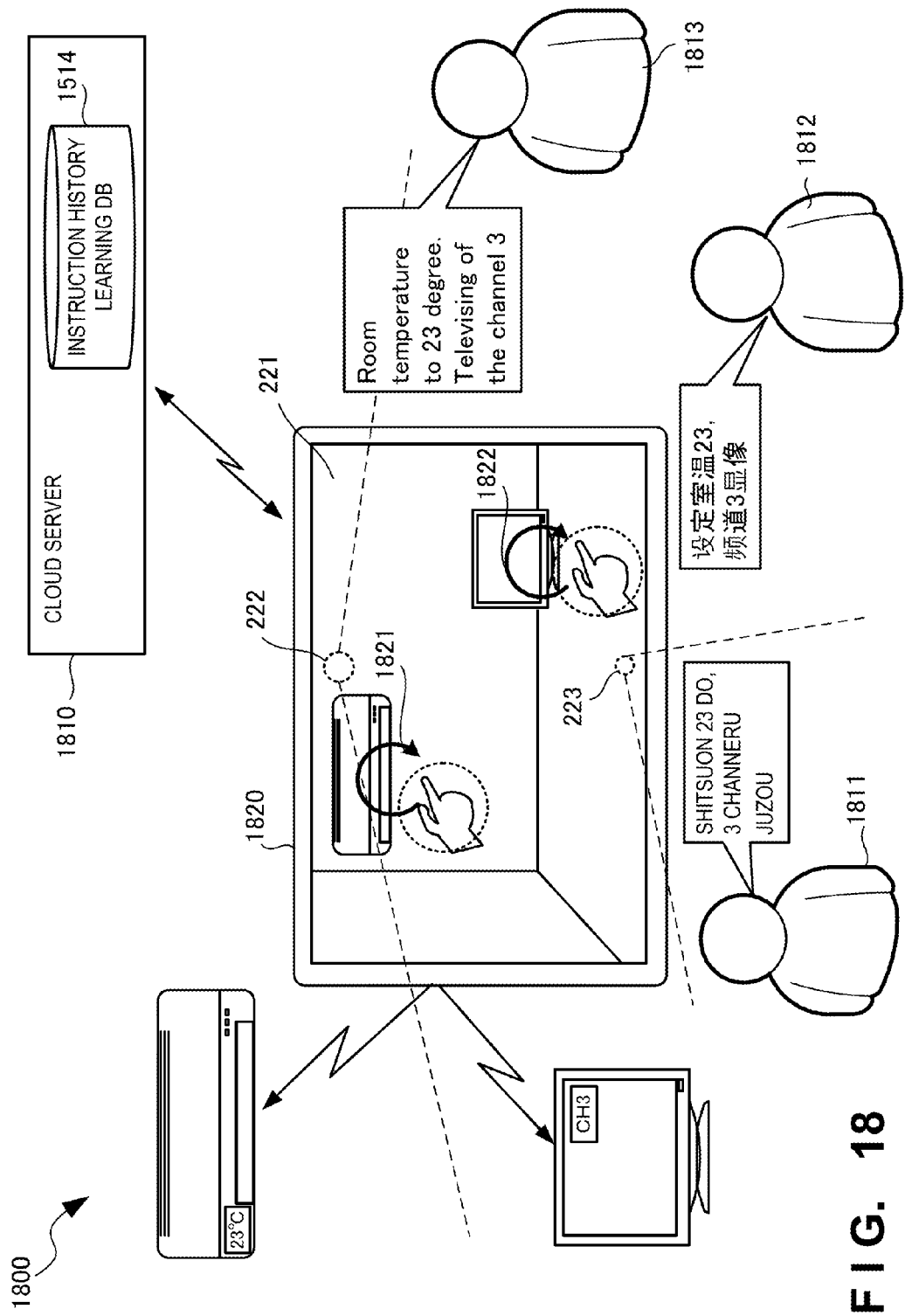
FIG. 18 is a view for explaining the concept of the operation of an information processing system according to the fourth embodiment of the present invention.

FIG. 18 is a view for explaining the concept of the operation of an information processing system 1800 according to this embodiment. Note that an instruction history learning database 1514 of a cloud server 1810 may be the same as that shown in FIG. 16.

Referring to FIG. 18, a video of a room captured by a camera 222 is displayed on a communication terminal 1820 such as a tablet or smartphone. There are an air conditioner and a television set in the room. While issuing an operation instruction for a control target from the video of the room, each of users 1811 to 1813 instructs control contents in each language.

In the video, an instruction operation 1821 for the air conditioner and an instruction operation 1822 for the television set are input through a touch panel 221. Note that the shapes of the instruction operations 1821 and 1822 may be different.

The Japanese 1811 issues a voice instruction "Shitsuon 23 do, 3 channeru juzou". The Chinese 1812 issues a voice instruction in Chinese, as shown in FIG. 18. The American 1813 issues a voice instruction "Room temperature to 23 degree. Televising of the channel 3".

According to this embodiment, regardless of the nationality and spoken language of the speaker of a voice instruction, the cloud server 1810 determines the search range of instruction contents, thereby quickly and reliably recognizing the instruction. The cloud server 1810 transmits an instruction operation command according to the user instruction, thereby implementing an operation according to the user instruction.

Note that in FIG. 18, the operation instruction is the operation instruction on the touch panel 221. As in the second embodiment, however, an operation instruction may be acquired from a video obtained by capturing the gesture or motion of the user by the camera 222.

According to this embodiment, it is possible to instruct to automatically control an electronic device in a room by combining instruction voice information and instruction operation information.

Fifth Embodiment

An information processing system according to the fifth embodiment of the present invention will be described. The information processing system according to this embodiment is different from that in the second or fourth embodiment in that a manipulation instruction of the user is recognized by a communication terminal instead of a cloud server based on instruction voice information and instruction operation information. Since other components and operations are the same as those in the second or fourth embodiment, the same reference numerals and symbols denote the same components and operations, and a detailed description thereof will be omitted.

According to this embodiment, since a communication terminal recognizes a user manipulation instruction, it is possible to reduce communication traffic to quickly recognize the instruction.

<<Operation Procedure of Information Processing System>>

Figure 19:
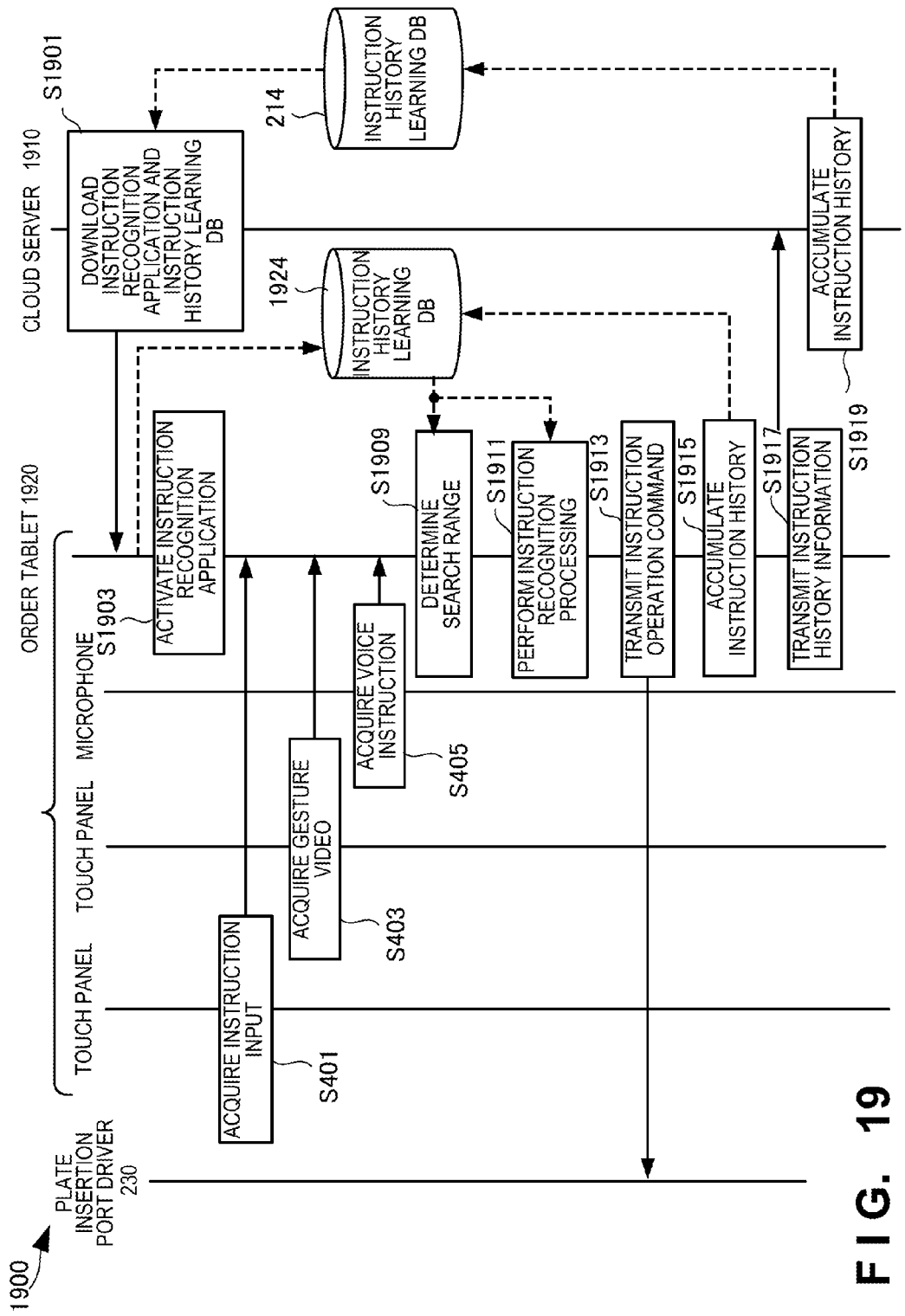
FIG. 19 is a sequence chart showing the operation procedure of an information processing system according to the fifth embodiment of the present invention.

FIG. 19 is a sequence chart showing the operation procedure of an information processing system 1900 according to this embodiment. Note that the same step numbers as in FIG. 4 of the second embodiment denote the same steps in FIG. 19 and a description thereof will be omitted.

In step S1901, a cloud server 1910 downloads an instruction recognition application and some data of an instruction history learning database 214 to an order tablet 1920 as a communication terminal. Note that some data of the instruction history learning database 214 may be data within a range corresponding to a user manipulation instruction recognized by the order tablet 1920.

The order tablet 1920 stores the received data of the instruction history learning database 214 in an instruction history learning DB 1924 of itself, and activates, in step S1903, the downloaded instruction recognition application. As in FIG. 4, the order tablet 1920 acquires an instruction input from a touch panel, a gesture video from a camera, or a voice instruction from a microphone in step S401, S403, or S405.

In step S1909, the order tablet 1920 determines a search range for recognizing each instruction based on acquisition of the instruction input from the touch panel, acquisition of the gesture video from the camera, or acquisition of the voice instruction from the microphone by referring to the instruction history learning DB 1924. In step S1911, the order tablet 1920 searches the search range, and recognizes a matching search result as an instruction by referring to the instruction history learning DB 1924. In step S1913, the order tablet 1920 generates an instruction operation command corresponding to the recognized instruction, and transmits the generated command to a target device. In this embodiment, the target device is a plate insertion port activator 230.

In step S1915, the order tablet 1920 accumulates a recognized instruction history in association with the acquired instruction information in the instruction history learning DB 1924. In step S1917, the order tablet 1920 transmits, to the cloud server 1910, the recognized instruction history in association with the acquired instruction information. In step S1919, the cloud server 1910 accumulates, as the whole learning history, the recognized instruction history in association with the acquired instruction information in the instruction history learning database 214.

Note that the structure of the instruction history learning DB 1924 is the same as that shown in FIG. 7 except that the accumulated data amount corresponds to the order tablet 1920, and a description thereof will be omitted. In FIG. 19, contents of the instruction history learning DB 1924 are downloaded from the cloud server 1910. However, the order tablet 1920 may have the instruction history learning DB 1924 independently.

<<Functional Arrangement of Order Tablet>>

FIG. 20 is a block diagram showing the functional arrangement of the order tablet 1920 according to the fifth embodiment of the present invention. Note that the same reference numerals as in FIG. 6 of the second embodiment denote the same functional components in FIG. 20 and a description thereof will be omitted.

An instruction recognition application/instruction history learning DB receiver 2001 receives the instruction recognition application and data of the instruction history learning DB associated with the order tablet 1920 from the cloud server 1910 via a communication controller 604. The data of the instruction history learning DB are stored in the instruction history learning DB 1925.

An instruction recognition application executor 2002 executes the instruction recognition application downloaded from the cloud server 1910, thereby implementing instruction recognition. The instruction recognition application executor 2002 includes an instruction information acquirer 2003, a search range determining unit 2004, a user instruction recognizer 2005, and an instruction operation command generator 2006.

The instruction information acquirer 2003 acquires user instruction information from a touch panel 221, a microphone 223, or a camera 222. Based on one of the pieces of the instruction information acquired by the instruction information acquirer 2003, the search range determining unit 2004 determines search ranges for instruction recognition of the remaining ones of the pieces of the instruction information by referring to the instruction history learning database 1924. The user instruction recognizer 2005 searches the search ranges determined by the search range determining unit 2004 by referring to the instruction history learning database 1924 based on a combination of the pieces of instruction information received by the instruction information acquirer 2003, thereby recognizing a user instruction.

The instruction operation command generator 2006 generates an instruction operation command according to the user instruction recognized by the user instruction recognizer 2005. A USB driver executor 611 transmits the instruction operation command generated by the instruction operation command generator 2006 to the plate insertion port driver 230 via a USB connector 610. Furthermore, the instruction operation command generated by the instruction operation command generator 2006 is transmitted to the cloud server 1910 via the communication controller 604 in association with the acquired instruction information, and accumulated.

Note that similarly to the cloud server 210 of the second embodiment, the search range determining unit 2004 of the order tablet 1920 of FIG. 20 includes a search range determination table (not shown). The user instruction recognizer 2005 includes a user instruction recognition table (not shown). The instruction operation command generator 2006 includes an instruction operation command generation table (not shown). The structures of these tables are the same as those shown in FIGS. 9A, 9B, and 10, respectively, and a description thereof will be omitted.

According to this embodiment, since a communication terminal recognizes a user manipulation instruction, it is possible to reduce communication traffic, thereby quickly recognizing an instruction.

Other Embodiments

Note that in the aforementioned embodiments, a case in which a manipulation instruction of a worker in a restaurant or a manipulation instruction to an electronic device installed within a room is recognized based on a voice and operation has been explained. However, the technique of recognizing a user manipulation instruction based on a voice and operation according to the present invention is applicable to various techniques of recognizing a user manipulation instruction for a communication terminal that uses both a camera and a microphone. For example, the technique is readily applied to a technique of, when a cloud server manages a conference system to which a user joins, recognizing a user instruction to the conference system based on the voice and operation of the user acquired by a communication terminal constituting the conference system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when a control program for implementing the functions of the embodiments is supplied to the system or apparatus directly or from a remote site. Hence, the present invention also incorporates the control program installed in a computer to implement the functions of the present invention on the computer, a storage medium storing the control program, and a WWW (World Wide Web) server that causes a user to download the control program. The present invention specifically incorporates at least a non-transitory computer readable medium.

This application claims the benefit of Japanese Patent Application No. 2012-123804 filed on May 30, 2012, which is hereby incorporated by reference herein in its entirety.

The invention claimed is:

1. An information processing apparatus comprising:
   an instruction information receiver that receives a set of first instruction information acquired from a voice of a user, and second instruction information acquired from a finger gesture or a finger motion of the user;
   a search range determining unit that determines, in accordance with the first instruction information, a second search range for recognizing the second instruction information, or, in accordance with the second instruction information, a first search range for recognizing the first instruction information;
   a user instruction recognizer that recognizes an instruction of the user based on a first search result obtained by searching for the first instruction information within the first search range or a second search result obtained by searching for the second instruction information within the second search range; and an instruction history accumulator that accumulates, in association with each other, the set of the first and second instruction information and an appearance count of recognition failure indicating that said user instruction recognizer has erroneously recognized the instruction of the user, wherein said search range determination unit adds a recognition result of the recognition failure to at least one of the first search range and the second search range, when it is determined that the appearance count of the recognition failure exceeds a threshold by referring to said instruction history accumulator.

2. The information processing apparatus according to claim 1, wherein said instruction information receiver further receives device information of a device as an instruction target of the user, and further comprising an operation command transmitter that transmits an operation command of the device according to the instruction of the user recognized by said user instruction recognizer.

3. The information processing apparatus according to claim 1, wherein the second instruction information is acquired based on the gesture or the finger motion of the user from a camera that captures an instruction operation of the user.

4. The information processing apparatus according to claim 3, wherein the second instruction information is acquired, from a touch panel used to input the instruction operation of the user, based on the finger motion of the user on the touch panel.

5. The information processing apparatus according to claim 1, wherein said search range determining unit acquires an attribute of the user based on at least one of the voice of the user and the finger gesture or the finger motion of the user, and determines at least one of the first and second search ranges according to the attribute of the user.

6. The information processing apparatus according to claim 5, wherein the attribute of the user includes one of a nationality of the user, a spoken language of the user, a race of the user, an occupation of the user, an environment of the user, a scene that the user has encountered, a habit of the user, and a dialect of the user.

7. The information processing apparatus according to claim 1, wherein the user is a worker in a store, and said user instruction recognizer recognizes an instruction of the worker.

8. The information processing apparatus according to claim 1, wherein said user instruction recognizer recognizes a manipulation instruction of the user for a device installed in a room.

9. The information processing apparatus according to claim 1, wherein said information processing apparatus manages a conference system to which the user joins, and said user instruction recognizer recognizes an instruction of the user to the conference system.

10. A communication terminal communicating with the information processing apparatus according to claim 1, comprising:

a voice detector that detects the voice of the user;
an operation detector that detects the finger gesture or the finger motion of the user;
an instruction information transmitter that acquires the first instruction information from the voice of the user via said voice detector, acquires the second instruction information from the finger gesture or the finger motion of the user via said operation detector, and transmits, to the information processing apparatus, a set of the first instruction information and the second instruction information together with device information of a device as an instruction target of the user;

an operation command receiver that receives, from the information processing apparatus, an operation command of the device according to an instruction of the user recognized by the information processing apparatus based on the set of the first instruction information and the second instruction information; and an operation command output unit that outputs, to the device as the instruction target of the user, the operation command received by said operation command receiver.

11. A control method of a communication terminal communicating with the information processing apparatus according to claim 1, comprising:

acquiring the first instruction information from the voice of the user via a voice detector, acquiring the second instruction information from the finger gesture or the finger motion of the user via an operation detector, and transmitting, to the information processing apparatus, a set of the first instruction information and the second instruction information together with device information of a device as an instruction target of the user;

receiving, from the information processing apparatus, an operation command of the device according to an instruction of the user recognized by the information processing apparatus based on the set of the first instruction information and the second instruction information; and outputting, to the device as the instruction target of the user, the operation command received in the receiving step.

12. A non-transitory computer-readable storage medium storing a control program of a communication terminal, communicating with the information processing apparatus according to claim 1, for causing a computer to execute a method, comprising:

acquiring the first instruction information from the voice of the user via a voice detector, acquiring the second instruction information from the finger gesture or the finger motion of the user via an operation detector, and transmitting, to the information processing apparatus, a set of the first instruction information and the second instruction information together with device information of a device as an instruction target of the user;

receiving, from the information processing apparatus, an operation command of the device according to an instruction of the user recognized by the information processing apparatus based on the set of the first instruction information and the second instruction information; and outputting, to the device as the instruction target of the user, the operation command received in the receiving step.

13. A control method of an information processing apparatus, comprising:

receiving a set of first instruction information acquired from a voice of a user, and second instruction information acquired from a finger gesture or a finger motion of the user;

determining, in accordance with the first instruction information, a second search range for recognizing the second instruction information, or, in accordance with the second instruction information, a first search range for recognizing the first instruction information;

recognizing an instruction of the user based on a first search result obtained by searching for the first instruction information within the first search range or a second search result obtained by searching for the second instruction information within the second search range; and accumulating, as a recognition history in association with each other, the set of the first and second instruction information and an appearance count of recognition failure indicating that the user instruction has been erroneously recognized, wherein, in said determining step, a recognition result of the recognition failure is added to at least one of the first search range and the second search range, when it is determined that the appearance count of the recognition failure exceeds a threshold by referring to the accumulated recognition history.

14. A non-transitory computer-readable storage medium storing a control program of an information processing apparatus for causing a computer to execute a method, comprising:

receiving a set of first instruction information acquired from a voice of a user, and second instruction information acquired from a finger gesture or a finger motion of the user;

determining, in accordance with the first instruction information, a second search range for recognizing the second instruction information, or, in accordance with the second instruction information, a first search range for recognizing the first instruction information;

recognizing an instruction of the user based on a first search result obtained by searching for the first instruction information within the first search range or a second search result obtained by searching for the second instruction information within the second search range; and accumulating, as a recognition history in association with each other, the set of the first and second instruction information and an appearance count of recognition failure indicating that the user instruction has been erroneously recognized, wherein, in said determining step, a recognition result of the recognition failure is added to at least one of the first search range and the second search range, when it is determined that the appearance count of the recognition failure exceeds a threshold by referring to the accumulated recognition history.

15. A communication terminal comprising:

a voice detector that detects a voice of a user;

an operation detector that detects a finger gesture or a finger motion of the user;

an instruction information acquirer that acquires a set of first instruction information from the voice of the user, and second instruction information from a finger gesture or a finger motion of the user;

a search range determining unit that determines in accordance with the first instruction information, a second search range for recognizing the second instruction information, or, in accordance with the second instruction information, a first search range for recognizing the first instruction information;

a user instruction recognizer that recognizes an instruction of the user based on a first search result obtained by searching for the first instruction information within the first search range or a second search result obtained by searching for the second instruction information within the second search range; and an instruction history accumulator that accumulates, in association with each other, the set of the first and second instruction information and an appearance count of recognition failure indicating that said user instruction recognizer has erroneously recognized the instruction of the user, wherein said search range determination unit adds a recognition result of the recognition failure to at least one of the first search range and the second search range, when it is determined that the appearance count of the recognition failure exceeds a threshold by referring to said instruction history accumulator.

16. A control method of a communication terminal, comprising:

detecting a voice of a user;

detecting a finger gesture or a finger motion of the user;

acquiring a set of first instruction information from a voice of the user, and second instruction information from the finger gesture or the finger motion of the user;

determining, in accordance with the first instruction information, a second search range for recognizing the second instruction information, or, in accordance with the second instruction information, a first search range for recognizing the first instruction information;

recognizing an instruction of the user based on a first search result obtained by searching for the first instruction information within the first search range or a second search result obtained by searching for the second instruction information within the second search range determined in the determining step; and accumulating, as a recognition history in association with each other, the set of the first and second instruction information and an appearance count of recognition failure indicating that the user instruction has been erroneously recognized, and wherein, in said determining step, a recognition result of the recognition failure is added to at least one of the first search range and the second search range, when it is determined that the appearance count of the recognition failure exceeds a threshold by referring to the accumulated recognition history.

17. A non-transitory computer-readable storage medium storing a control program of a communication terminal for causing a computer to execute a method, comprising:

detecting a voice of a user;

detecting a finger gesture or a finger motion of the user;

acquiring a set of first instruction information from the voice of the user, and second instruction information from the finger gesture or the finger motion of the user;

determining, in accordance with the first instruction information, a second search range for recognizing the second instruction information, or, in accordance with the second instruction information, a first search range for recognizing the first instruction information;

recognizing an instruction of the user based on a first search result obtained by searching for the first instruction information within the first search range or a second search result obtained by searching for the second instruction information within the second search range determined in the determining step; and accumulating, as a recognition history in association with each other, the set of the first and second instruction information and an appearance count of recognition failure indicating that said user instruction recognizer has erroneously recognized the instruction of the user,
wherein, in said determining step, a recognition result of the recognition failure is added to at least one of the first search range and the second search range, when it is determined that the appearance count of the recognition failure exceeds a threshold by referring to the accumulated recognition history.

18. An information processing system including an information processing apparatus and a communication terminal which are connected via a network,
said information processing apparatus comprising:
an instruction information receiver that receives, together with device information of a device as an instruction target of a user, a set of first instruction information acquired from a voice of the user, and second instruction information acquired from a finger gesture or a finger motion of the user;
a search range determining unit that determines, in accordance with the first instruction information, a second search range for recognizing the second instruction information, or, in accordance with the second instruction information, a first search range for recognizing the first instruction information;
a user instruction recognizer that recognizes an instruction of the user based on a first search result obtained by searching for the first instruction information within the first search range or a second search result obtained by searching for the second instruction information within the second search range determined by said search range determining unit;
an instruction history accumulator that accumulates, in association with each other, the set of the first and second instruction information and an appearance count of recognition failure indicating that said user instruction recognizer has erroneously recognized the instruction of the user; and
an operation command transmitter that transmits an operation command of the device according to the instruction of the user recognized by said user instruction recognizer,
wherein said search range determination unit adds a recognition result of the recognition failure to at least one of the first search range and the second search range, when it is determined that the appearance count of the recognition failure exceeds a threshold by referring to said instruction history accumulator; and
said communication terminal comprising:
a voice detector that detects the voice of the user,
an operation detector that detects the finger gesture or the finger motion of the user,
an instruction information transmitter that acquires the first instruction information via said voice detector, acquires the second instruction information via said operation detector, and transmits, to said information processing apparatus, the set of the first instruction information and the second instruction information together with the device information of the device;
an operation command receiver that receives, from said information processing apparatus, the operation command of the device according to the instruction of the user recognized by said information processing apparatus based on the set of the first instruction information and the second instruction information, and
an operation command output unit that outputs, to the device as the instruction target of the user, the operation command received by said operation command receiver.

19. An information processing method of an information processing system including an information processing apparatus and a communication terminal which are connected via a network, comprising:
by the information processing apparatus,
receiving, together with device information of a device as an instruction target of a user, a set of first instruction information acquired from a voice of the user, and second instruction information acquired from a finger gesture or a finger motion of the user;
determining, in accordance with the first instruction information, a second search range for recognizing the second instruction information, or, in accordance with the second instruction information, a first search range for recognizing the first instruction information;
recognizing an instruction of the user based on a first search result obtained by searching for the first instruction information within the first search range or a second search result obtained by searching for the second instruction information within the second search range determined in the determining step;
accumulating, in association with each other, a set of the first and second instruction information and an appearance count of recognition failure indicating that said user instruction recognizer has erroneously recognized the instruction of the user; and
transmitting an operation command of the device according to the instruction of the user recognized in the recognizing step,
wherein, in said determining step, a recognition result of the recognition failure is added to at least one of the first search range and the second search range, when it is determined that the appearance count of the recognition failure exceeds a threshold by referring to the accumulated recognition history, and
by the communication terminal
acquiring the first instruction information via a voice detector that detects the voice of the user, acquiring the second instruction information via an operation detector that detects the operation of the user, and transmitting, to said information processing apparatus, the set of the first instruction information and the second instruction information together with device information of the device;
receiving, from the information processing apparatus, the operation command of the device according to an instruction of the user recognized by the information processing apparatus based on the set of the first instruction information and the second instruction information; and
outputting, to the device as the instruction target of the user, the operation command received in the receiving step.

* * * * *